United States Patent
Strand et al.

(10) Patent No.: US 11,082,641 B2
(45) Date of Patent: *Aug. 3, 2021

(54) DISPLAY SYSTEMS AND METHODS ASSOCIATED WITH PULSE DETECTION AND IMAGING

(71) Applicant: FLIR Surveillance, Inc., Wilsonville, OR (US)

(72) Inventors: Timothy A. Strand, Ventura, CA (US); Falgun D. Patel, Ventura, CA (US)

(73) Assignee: FLIR Surveillance, Inc., Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,025

(22) Filed: Feb. 26, 2020

(65) Prior Publication Data

US 2020/0296304 A1    Sep. 17, 2020

Related U.S. Application Data

(60) Provisional application No. 62/817,406, filed on Mar. 12, 2019.

(51) Int. Cl.
*H04N 5/33*          (2006.01)
(52) U.S. Cl.
CPC .................................... *H04N 5/33* (2013.01)
(58) Field of Classification Search
None
See application file for complete search history.

(56) References Cited

U.S. PATENT DOCUMENTS

| | | | | |
|---|---|---|---|---|
| 7,541,588 B2* | 6/2009 | Tabirian | ................. | G01S 17/18 |
| | | | | 250/341.1 |
| 8,360,986 B2* | 1/2013 | Farag | ................. | A61B 5/02055 |
| | | | | 600/500 |
| 10,126,101 B2* | 11/2018 | Ell | ........................ | F41G 7/2293 |
| 2006/0122524 A1* | 6/2006 | Kawada | ............... | A61B 3/1241 |
| | | | | 600/513 |
| 2009/0027335 A1* | 1/2009 | Ye | ........................... | G06F 3/038 |
| | | | | 345/158 |
| 2015/0363646 A1* | 12/2015 | Way | ......................... | G06T 5/50 |
| | | | | 382/103 |
| 2016/0054417 A1* | 2/2016 | Kuhara | .............. | G01R 33/4818 |
| | | | | 324/309 |
| 2016/0100766 A1* | 4/2016 | Yoshioka | ............. | A61B 5/7278 |
| | | | | 600/301 |
| 2016/0228011 A1* | 8/2016 | Tsubaki | ............... | A61B 5/7203 |
| 2016/0302735 A1* | 10/2016 | Noguchi | ............... | A61B 5/746 |
| 2017/0112382 A1* | 4/2017 | Nakata | ................. | A61B 5/0245 |
| 2017/0219693 A1* | 8/2017 | Choiniere | ............. | H04N 5/332 |

(Continued)

*Primary Examiner* — Reza Aghevli
(74) *Attorney, Agent, or Firm* — Haynes and Boone, LLP

(57) ABSTRACT

Techniques are disclosed for display systems and methods associated with pulse detection and imaging. In one example, a system includes an imaging device configured to capture an image that includes a light pulse of a pulse sequence. The system further includes a display device. The display device is configured to receive data associated with the pulse sequence, where the data includes a location of the light pulse. The display device is further configured to display the image and an overlay on the image. The overlay is indicative of the location of the light pulse. Related devices and methods are also provided.

20 Claims, 9 Drawing Sheets

(56) References Cited

U.S. PATENT DOCUMENTS

| | | | |
|---|---|---|---|
| 2018/0080740 A1* | 3/2018 | Ell | F41G 7/226 |
| 2019/0204160 A1* | 7/2019 | Simolon | H04N 5/33 |
| 2020/0046310 A1* | 2/2020 | Richard | A61B 6/54 |
| 2020/0155008 A1* | 5/2020 | Fukuda | A61B 5/0037 |
| 2020/0213503 A1* | 7/2020 | Strand | H04N 5/23203 |
| 2020/0264279 A1* | 8/2020 | Patel | G01S 7/487 |

* cited by examiner

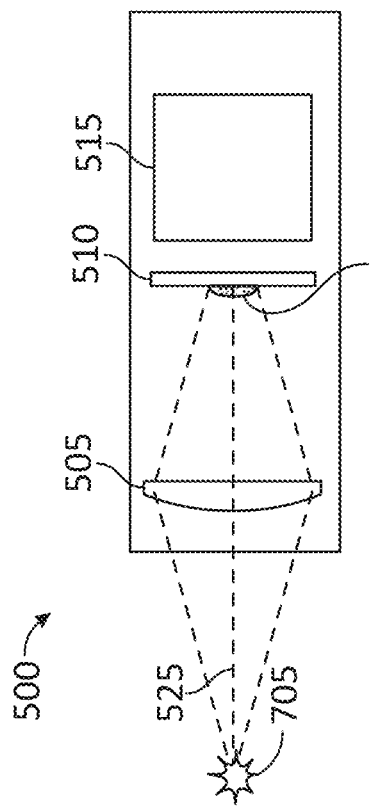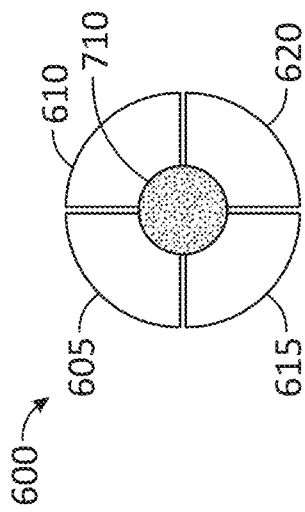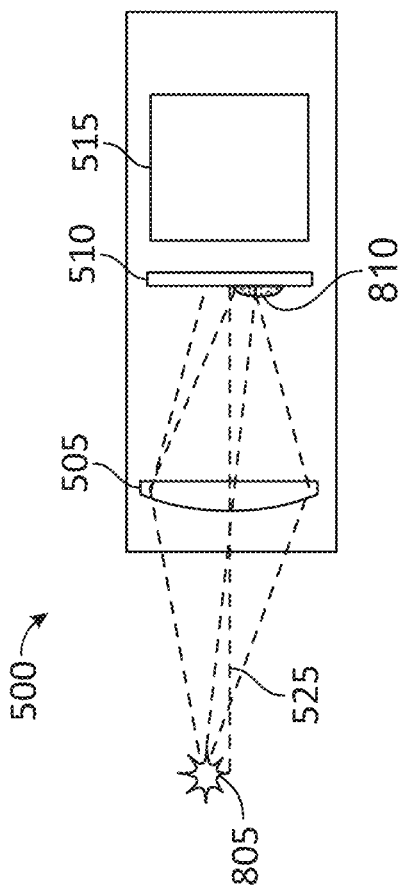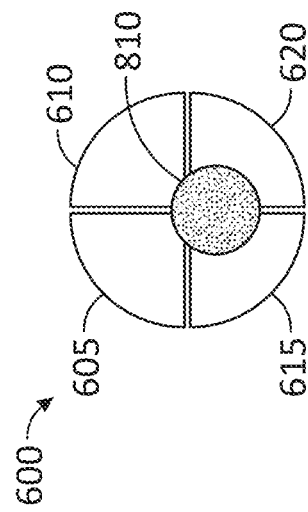

DISPLAY SYSTEMS AND METHODS ASSOCIATED WITH PULSE DETECTION AND IMAGING

CROSS REFERENCE TO RELATED APPLICATIONS

This application claims the benefit of and priority to U.S. Provisional Patent Application No. 62/817,406 filed Mar. 12, 2019 and entitled "DISPLAY SYSTEMS AND METHODS ASSOCIATED WITH PULSE DETECTION AND IMAGING," which is incorporated herein by reference in its entirety.

TECHNICAL FIELD

One or more embodiments relate generally to pulse detection and more particularly, for example, to display systems and methods associated with pulse detection and imaging.

BACKGROUND

Light signals and detection thereof may be utilized in various applications, such as in surveillance applications. As an example, a light source may be utilized to emit a light signal. Dependent on application, a location of the light source and/or a location of an object that reflects the light signal may be determined based on detection of the light signal by an appropriate detector.

SUMMARY

In one or more embodiments, a system includes an imaging device and a display device. The imaging device is configured to capture an image that includes a mid-wave infrared light pulse of a pulse sequence. The display device is configured to receive data associated with the pulse sequence, where the data includes a location of the mid-wave infrared light pulse. The display device is further configured to display the image and an overlay on the image. The overlay is indicative of the location of the mid-wave infrared light pulse.

In one or more embodiments, a method includes capturing an image that includes a mid-wave infrared light pulse of a pulse sequence. The method further includes receiving data associated with the pulse sequence, where the data includes a location of the mid-wave infrared light pulse. The method further includes displaying the image and an overlay on the image. The overlay is indicative of the location of the mid-wave infrared light pulse.

In one or more embodiments, a system includes a light pulse detection device configured to determine a location of a mid-wave infrared light pulse. The light pulse detection device is further configured to provide information indicative of at least the location to one or more devices.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7A illustrates a light source in relation to a light pulse detector device.

FIG. 7B illustrates a light pulse that has been focused by optics onto a detector.

FIG. 8A illustrates a light source in relation to a light pulse detector device.

FIG. 8B illustrates a light pulse that has been focused by optics onto a detector.

Figure 1:
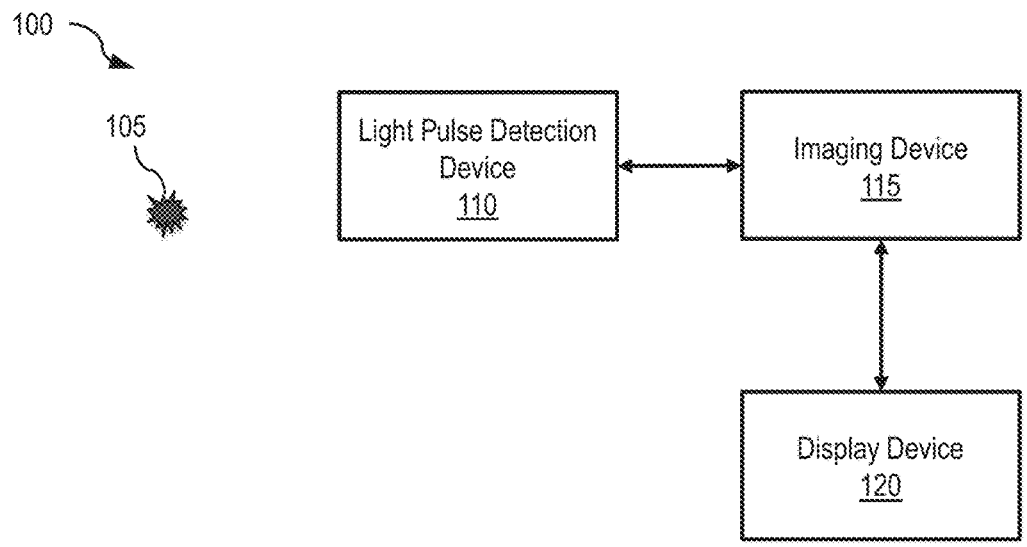
FIG. 1 illustrates an example of an environment in which pulse detection and synchronized pulse imaging may be implemented in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims. It is noted that sizes of various components are not necessarily drawn to scale in the drawings.

Various techniques are provided to facilitate pulse detection and synchronized pulse imaging. In some embodiments, a system includes a light pulse detection device and an imaging device. The light pulse detection device may include a pulse detector and supporting electronics. The supporting electronics may include a processing circuit and a communication circuit. The pulse detector may detect light pulses within its field of view (FOV). The processing circuit may analyze the detected light pulses and generate data associated with the detected light pulses. The communication circuit may facilitate communication within the light pulse detection device itself and/or with other devices, such as the imaging device. The imaging device can capture an image associated with a scene (e.g., a real world scene). In some aspects, the imaging device may include an image detector circuit and a readout circuit (e.g., an ROIC). The image detector circuit may capture (e.g., detect, sense) visible-light radiation, infrared radiation, and/or other portions of the electromagnetic spectrum. Images captured by the imaging device may be provided for display (e.g., to a user) using a display device (e.g., a screen).

In an embodiment, operation of the light pulse detection device and the imaging device in tandem facilitates pulse detection and synchronized pulse imaging. A field of view of the imaging device may be, may include, or may be a part of, a field of view of the light pulse detection device. In some cases, the light pulse detection device and/or the imaging device may have an adjustable field of view (e.g., adjustable manually, electronically, etc.), such that the field of view of the light pulse detection device may coincide with that of the imaging device to facilitate detection and imaging of light pulses. The image detector circuit may be operable to capture signals having wavelengths that coincide with wavelengths of the light pulses being detected for (e.g., scanned for) by the light pulse detection device.

The pulse detector may detect light pulses within its field of view. The processing circuit of the supporting electronics may determine whether a detected light pulse is associated with a pulse sequence. A pulse sequence may also be referred to as a light pulse sequence, a light pulse pattern, a pulse pattern, a light signal, a light signal code, or a code. The processing circuit may determine timing information associated with a next light pulse of the pulse sequence to be detected (e.g., expected to arrive) and generate data associated with the timing information. The communication circuit may transmit the data to the imaging device. In an aspect, the processing circuit may determine whether the detected light pulse is associated with one of a plurality of predetermined pulse sequences and generate data associated with a pulse sequence (e.g., data identifying the pulse sequence).

The imaging device may receive the data from the light pulse detection device. The imaging device may determine an integration period (e.g., a start of an integration period) based on the data and capture, using the determined integration period, an image that includes the next light pulse. An image that includes the next light pulse refers to an image in which the next light pulse appears.

In some aspects, to facilitate maintaining of a desired frame rate of the imaging device, the light pulse detection device may determine whether one or more additional frames may be captured before a determined (e.g., an expected) arrival time of the next light pulse. In this manner, a desired frame rate of the imaging device may be maintained without missing the next light pulse (e.g., without failing to capture the next light pulse in an image). An arrival time may be, or may be indicative of, a time at which the light source is determined to provide (e.g., emit, reflect) the next light pulse. An arrival time may be determined as a time at which the next light pulse is to be detected by the light pulse detection device. In this regard, the arrival time is, or is indicative of, a detection time of the next light pulse. An image that includes a light pulse may be referred to as a light-pulse image. An image that does not include a light pulse may be referred to as a non-light-pulse image.

In some cases, having non-light-pulse images may facilitate detection of light pulses of a pulse sequence, since the pulse sequence may appear in captured images as blinking due to light pulses appearing in light-pulse images and not appearing in non-light-pulse images (e.g., intermediate non-light-pulse images). In one case, such blinking may facilitate detection through visual inspection by a user (e.g., a pilot), such as by glancing at a screen on which the light-pulse images and non-light-pulse images are displayed (e.g., as part of a video). Alternative to or in addition to visual inspection, light pulses may be located in a scene by subtracting images captured by the imaging device, such as subtracting (e.g., pixel-by-pixel) a light-pulse image from a non-light-pulse image. In an aspect, when a pulse sequence has light pulses that approach the frame rate of the imaging device, which may cause light pulses to appear fixed (e.g., non-blinking) between captured images, the light pulse detection device may cause a blinking pulse sequence by causing the imaging device to miss (e.g., periodically miss) a light pulse.

In some embodiments, information associated with light pulses may be overlaid on images to facilitate detection of the light pulses in images (e.g., via visual inspection). Information associated with the light pulses may include a location of a light pulse associated with a pulse sequence, a blink rate associated with the pulse sequence, and/or other information. By way of non-limiting example, such information may be provided as a graphical overlay and/or a textual overlay on an image. The image may, but need not, include a light pulse. For example, even for an image that does not include a light pulse, a user may be benefited from seeing the graphical overlay and/or the textual overlay associated with a light pulse that is expected to be present in a subsequent image (e.g., a later image to be captured as part of video data). In this example, the overlay(s) may remain on images displayed to the user at least until such time that an associated pulse sequence is no longer being detected. In some cases, the overlay(s) may remain on images displayed to the user even after the associated pulse sequence is no longer being detected, since a determination as to why the pulse sequence is no longer being detected may need to be performed.

Depending on applications, light pulses may have visible-light wavelengths (e.g., viewable by human eyes) or more covert wavelengths, such as infrared wavelengths (e.g., mid-wave infrared wavelengths). A light source may be an object that emits a light pulse and/or an object that reflects a light pulse. As an example, light pulses may be emitted by a laser designator and reflected by an object, in which the reflected light pulses may be detected by the light pulse detection device. In this example, the object that reflects the light pulses may be considered the light source, and the light pulse and the reflected light pulse may have a laser designator wavelength of 1064 nm (or other wavelength). A light pulse may be referred to as a laser pulse or a laser spot in this example. As another example, a mid-wave infrared beacon may emit light pulses having a wavelength in the mid-wave wavelengths (e.g., a range between approximately 3 μm to 5 μm), and the light pulse detection device may detect these light pulses. In this example, the mid-wave infrared beacon may be considered the light source. In some cases, a pulse sequence may have a constant pulse repetition frequency (PRF) (e.g., also referred to as pulse repetition rate), in which a duration between any two temporally adjacent pulses of the pulse sequence is the same. In other cases, a duration between any two temporally adjacent pulses of the pulse sequence may be, but need not be, non-constant.

While the foregoing is described with respect to the light pulse detection device detecting a single pulse sequence in its field of view, in some aspects, the light pulse detection device may be utilized to facilitate detection (e.g., tracking) of multiple pulse sequences and imaging of these pulse sequences. The light pulse detection device may determine a respective pulse sequence associated with each received light pulse, determine a respective time at which a next light pulse of each of the pulse sequences is to occur, and transmit data indicative of such times (e.g., via one or more data packets) to the imaging device. According to the data from the light pulse detection device, the imaging device may capture one or more light-pulse images that include the light pulses. In this regard, each of these light-pulse images may include at least one of the light signals. In some cases, the light pulse detection device may cycle through a list of identified pulse sequences and trigger the imaging device according to each identified pulse sequence. For example, each identified pulse sequence may be triggered in sequence. In some cases, the light pulse detection device and/or the imaging device may determine which pulse sequence is to be displayed (e.g., to a user) in an image. For example, the light pulse detection device and/or the imaging device may record a last time or last light pulse of a pulse sequence that has been captured and displayed, and capture (or cause to capture) light pulses of identified pulse sequences as appropriate to ensure that none of the pulse sequences go long (e.g., in terms of time and/or number of images) without being displayed.

Thus, using various embodiments, the light pulse detection device may allow the imaging device to capture images that include light pulses associated with one or more identified pulse sequences, while facilitating maintaining a desired frame rate of the imaging device and/or detection of the light pulses in the captured images. In some aspects, a desired frame rate of the imaging device may be maintained while allowing capture of images including the light pulses. As an example embodiment, a light source may be a mid-wave infrared beacon. Imaging and detection tools/devices may be utilized to accommodate usage of such a beacon. For instance, targeting pods and imaging gimbals and turrets may contain a mid-wave infrared camera, which are capable of observing flashing mid-wave emissions of the beacon. Since a user (e.g., a pilot) periodically glances at captured mid-wave imagery (e.g., displayed on a screen), detection and location of a light pulse of a pulse sequence may be facilitated by timing a camera's integration time to capture images of the light pulses. In one case, a beacon may be utilized to mark a location, such as a landing zone. As one example, the beacon may be utilized by a user at the location to allow others (e.g., a pilot) to navigate toward or avoid the location depending on application. As another example, the beacon may be utilized by a user remote from a location to identify the location.

FIG. 1 illustrates an example of an environment 100 (e.g., network environment) in which pulse detection and synchronized pulse imaging may be implemented in accordance with one or more embodiments of the present disclosure. Not all of the depicted components may be required, however, and one or more embodiments may include additional components not shown in FIG. 1. Variations in the arrangement and type of the components may be made without departing from the spirit or scope of the claims as set forth herein. Additional, fewer, and/or different components may be provided.

The environment 100 includes a light source 105, a light pulse detection device 110, an imaging device 115, and a display device 120. The light pulse detection device 110, the imaging device 115, and the display device 120 are capable of communicating with each other via wired and/or wireless communication. Communication may be based on one or more wireless communication technologies, such as Wi-Fi (IEEE 802.11ac, 802.11ad, etc.), cellular (3G, 4G, 5G, etc.), Bluetooth™, etc. and/or one or more wired communication technologies, such as Ethernet, Universal Serial Bus (USB), etc. In some cases, the light pulse detection device 110, the imaging device 115, and/or the display device 120 may communicate with each other via a wired and/or a wireless network. The network(s) may include a local area network (LAN), a wide area network (WAN), an Intranet, or a network of networks (e.g., the Internet). In some cases, the light pulse detection device 110 and/or the imaging device 115 may include an internal or external global positioning system (GPS) device to provide location (e.g., latitude, longitude, and/or altitude) and timing services. In some cases, the light pulse detection device 110, the imaging device 115, and the display device 120 may form, or may form a part of, a detection system. The detection system may be, or may be a part of, a surveillance system for providing situational awareness to one or more users (e.g., a pilot).

The connections (e.g., wired, wireless) shown in FIG. 1 between the light pulse detection device 110, the imaging device 115, and the display device 120 are provided by way of non-limiting example. In some cases, the connections may include intra-chip, inter-chip (e.g., within the same device or between different devices), and/or inter-device connections. For example, although the light pulse detection device 110, the imaging device 115, and the display device 120 are depicted in FIG. 1 as separate devices connected (e.g., wire connected, wirelessly connected) to other devices and with their own enclosures (e.g., represented as rectangles), in some cases the light pulse detection device 110, the imaging device 115, and the display device 120 may be integrated on the same integrated circuit and/or enclosed in a common housing. For example, the light pulse detection device 110, the imaging device 115, and the display device 120 may be connected via intra-chip connections (e.g., traces). Additional, fewer, and/or different connections may be provided.

The light source 105 may generally be any component capable of providing a light signal. A light signal may include a sequence of light pulses (e.g., also referred to as a light pulse sequence or a pulse sequence). In some cases, pulses of the light signal from the light source 105 may have a constant pulse repetition rate, in which a pulse is periodically provided by the light source 105 in accordance with a constant frequency (e.g., duration between temporally adjacent pulses of a light signal remains constant or substantially constant). In other cases, light pulses of a pulse sequence do not have a constant pulse repetition rate, such that a duration between two temporally adjacent pulses of the light signal need not be the same as a corresponding duration between another two temporally adjacent pulses. As an example, in a case of a pulse sequence with a first light pulse temporally adjacent to a second light pulse and the second light pulse temporally adjacent to a third light pulse, a time between the first light pulse and the second light pulse of the pulse sequence emitted by the light source 105 may be different from a time between the second light pulse and the third light pulse of the pulse sequence emitted by the light source 105.

The light source 105 may be associated with a ground-based object, a naval-based object, an aerial-based object, and/or generally any object that can emit and/or reflect a light pulse. In one case, the light source 105 may be an object (e.g., building, vehicle) that reflects a light pulse. For example, the light pulse may be from a laser designator (e.g., to designate the object). In another case, the light source 105 may be an emitter of light pulses. For example, the light source 105 may be a laser designator or a beacon. A beacon may be utilized by its user to mark a location of the user for example. Depending on applications, light pulses may have visible-light wavelengths (e.g., viewable by human eyes) or more covert wavelengths, such as infrared wavelengths (e.g., mid-wave infrared wavelengths). As an example, a light pulse from a laser designator may have a wavelength of 1064 nm (or other wavelength). As another example, a mid-wave infrared beacon may emit light having a wavelength in the mid-wave infrared wavelengths (e.g., a range between approximately 3 µm to 5 µm).

The light pulse detection device 110 can detect (e.g., capture, sense) light pulses having a wavelength within a bandwidth of the light pulse detection device 110. A light pulse may be a part of a pulse sequence provided by the light source 105. In some aspects, the light pulse detection device 110 may detect light pulses with wavelengths in the infrared range and/or visible-light range. For example, in some aspects, the light pulse detection device 110 may be sensitive to (e.g., better detect) mid-wave infrared (MWIR) light pulses, long-wave IR (LWIR) light pulses (e.g., electromagnetic radiation (EM) with wavelength of 7-14 µm), and/or any desired IR wavelengths (e.g., generally in the 0.7 µm to 14 µm range). In one case, the light pulse detection device 110 may include a quadrant detector.

The light pulse detection device 110 determines (e.g., identifies) a pulse sequence associated with a light pulse received by the light pulse detection device 110 (e.g., the light pulse is within a field of view of the light pulse detection device 110). In an aspect, a pulse sequence may also be referred to as a light pulse sequence, a light pulse pattern, a pule pattern, a light signal, a light signal code, or a code. As an example, when the light source 105 is a laser designator, a pulse sequence may be referred to as a laser designator code. In some embodiments, the light pulse detection device 110 may determine a pulse sequence associated with a received light pulse based on timing information associated with multiple light pulses (e.g., including the received light pulse) of the pulse sequence. For a given light pulse, the light pulse detection device 110 may track (e.g., store) a time (e.g., using a timestamp) at which the light pulse is detected (e.g., received) by the light pulse detection device 110. The light pulse detection device 110 may utilize timing information associated with the light pulse and/or other light pulses (e.g., detected by the light pulse detection device 110 prior to the light pulse) to determine whether the light pulse is part of a pulse sequence. For example, the light pulse detection device 110 may determine a time difference between detecting two light pulses and utilize the time difference to determine whether the two light pulses are part of the same pulse sequence or part of two different pulse sequences. In cases with more complex pulse sequences, the light pulse detection device 110 may utilize timing information for three or more light pulses to determine (e.g., identify) a pulse sequence associated with the light pulses. Identifying/determining a pulse sequence may be referred to as decoding the pulse sequence. In some cases, the pulse sequence may be one of a plurality of predetermined pulse sequences known by the light pulse detection device 110. For example, the light pulse detection device 110 may store a listing of predetermined pulse sequences. Alternatively or in addition, the pulse sequence may have a constant pulse repetition frequency that can be determined by the light pulse detection device 110.

When a pulse sequence has been identified, the light pulse detection device 110 may determine (e.g., predict, estimate) an arrival time of a next light pulse of the pulse sequence and send data indicative of the next light pulse to the imaging device 115. In an aspect, an arrival time may be a time at which the next light pulse is expected to be capturable by the light pulse detection device 110 and/or the imaging device 115. In this regard, the arrival time may be, or may be indicative of, a time at which the light source 105 is determined to provide (e.g., emit, reflect) the next light pulse. The data may include an indication of such time and/or act as a trigger signal to cause the imaging device 115 to capture the light signal.

With the data from the light pulse detection device 110, the imaging device 115 may start integrating before the next light pulse is provided by the light source 105 to allow the imaging device 115 to capture an image that includes the next light pulse (e.g., the next light pulse falls within an integration period of the imaging device 115). In this regard, the imaging device 115 needs a finite time to start integrating, such that foreknowledge of an arrival time of the next light pulse is generally needed to capture an image including the light pulse. With such foreknowledge, images of light signals may be captured even in cases that the integration time of the imaging device 115 is a small fraction of its frame time.

The light pulse detection device 110 may transmit data indicative of such timing information to the imaging device 115 to cause the imaging device 115 to start an integration period or set a starting time of an integration period to capture the next light pulse in an image. In some cases, the data transmitted by the light pulse detection device 110 may include a location associated with the next light pulse and/or the light source 105, pulse rate information and/or pulse sequence information, and/or a predicted time(s) of one or more subsequent light pulses associated with a pulse sequence. In some cases, the data transmitted by the light pulse detection device 110 to the imaging device 115 may be a trigger signal (e.g., an instruction) that, upon receipt by the imaging device 115, causes the imaging device 115 to start an integration period. Such a trigger signal may be received by the imaging device 115 at around the time that the imaging device 115 is to start its integration time in order to capture the next light pulse. The data received by the light pulse detection device 110 may, but need not, include an indication of a time at which the next light pulse is determined (e.g., estimated) to arrive. An amount of time between receiving the trigger signal and starting an integration period may be set by a user in some cases. This amount of time may be referred to as a pre-trigger time.

In other cases, alternatively or in addition, the data from the light pulse detection device 110 may include timing information indicative of a time at which the next light pulse is determined to arrive, such that the imaging device 115 may start an integration period according to the timing information. In some aspects, the data from the light pulse detection device 110 may indicate an arrival time for each of a plurality of subsequent light pulses associated with the pulse sequence. In such aspects, the light pulse detection device 110 may send fewer packets relative to a case in which the light pulse detection device 110 sends one packet to the imaging device 115 per light pulse to be captured by the imaging device 115. In this regard, the data transmitted by the light pulse detection device 110 may indicate an arrival time(s) of a next light pulse(s), and the imaging device 115 may have autonomy to set a starting time(s) of an integration period(s) according to the data from the light pulse detection device 110.

The imaging device 115 can capture an image associated with a scene (e.g., a real world scene). An image may be referred to as a frame or an image frame. In an embodiment, the imaging device 115 may include an image detector circuit and a readout circuit (e.g., an ROIC). In some aspects, the image detector circuit may capture (e.g., detect, sense) visible-light radiation and/or infrared radiation. A field of view of the imaging device 115 may be, may include, or may be a part of, a field of view of the light pulse detection device 110. In some cases, the light pulse detection device 110 and/or the imaging device 115 may have an adjustable field of view (e.g., adjustable manually, electronically, etc.), such that the field of view of the light pulse detection device 110 may coincide with that of the imaging device 115 to facilitate detection and imaging of light pulses.

To capture an image, the image detector circuit may detect image data (e.g., in the form of EM radiation) associated with the scene and generate pixel values of the image based on the image data. In some cases, the image detector circuit may include an array of detectors that can detect EM radiation, convert the detected EM radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting example, each detector may be a photodetector, such as an avalanche photodiode, an infrared photodetector, a quantum well infrared photodetector, a microbolometer, or other detector capable of converting EM radiation (e.g., of a certain wavelength) to a pixel value.

The readout circuit may be utilized as an interface between the image detector circuit that detects the image data and a processing circuit that processes the detected image data as read out by the readout circuit. The readout circuit may read out the pixel values generated by the image detector circuit. An integration time for a detector may correspond to an amount of time that incoming radiation striking the detector is converted to electrons that are stored prior to a signal being read (e.g., in an integration capacitor that may be opened or shorted). A frame rate may refer to the rate (e.g., images per second) at which images are detected in a sequence by the image detector circuit and provided to the processing circuit by the readout circuit. A frame time is the inverse of the frame rate and provides a time between providing of each image to the processing circuit by the readout circuit. An integration time (e.g., also referred to as an integration period) is a fraction of the frame time. In some cases, the frame time may include the integration time and a readout time (e.g., associated with readout of the pixel values by the readout circuit).

In an embodiment, the imaging device 115 may capture images based on data received from the light pulse detection device 110. The data from the light pulse detection device 110 may allow the imaging device 115 to capture images such that light pulses of pulse sequences are included in these images. In some aspects, capturing an image that includes a light pulse may provide situational awareness to a user (e.g., a pilot) by allowing the user to observe the light pulse as well as a scene (e.g., buildings, humans, machinery) that encompasses the light pulse. In some aspects, the imaging device 115 may include a short-wave infrared imager, a mid-wave infrared imager, and/or a visible-light imager.

The display device 120 (e.g., screen, touchscreen, monitor) may be used to display captured and/or processed images and/or other images, data, and/or information (e.g., legend relating color in the images with temperatures). For example, the images (or a visual representation of the images) may be displayed as individual static images and/or as a series of images in a video sequence. A user may visually observe the scene by looking at the display device 120. In an embodiment, the display device 120 may display an image and one or more overlays on the image. The overlay(s) may be indicative of information associated with light pulses.

In some embodiments, the light pulse detection device 110 may facilitate capturing of images including light pulses (e.g., also referred to as light-pulse images) while maintaining a desired frame rate of the imaging device 115. In this regard, for example, a frame rate of the imaging device 115 is generally higher than a pulse repetition rate associated with pulse sequences. In some cases, the light source 105 may have a pulse repetition rate between 1 Hz and 25 Hz. For example, the light source 105 may be a laser designator that operates (e.g., emits a pulse) between 8 Hz and 20 Hz pulse repetition rates. The imaging device 115 may have a higher frame rate, such as 30 Hz or 60 Hz.

To maintain a higher frame rate (e.g., closer to that of the imaging device 115 rather than a pulse repetition rate), the light pulse detection device 110 may determine an arrival time of a next light pulse of an identified pulse sequence and, if there is sufficient time available, cause capture of one or more intermediate, non-light-pulse images by the imaging device 115 without missing the next light pulse. A non-light-pulse image may refer to an image that does not include a light pulse. A light-pulse image may refer to an image that includes a light pulse. For example, the light pulse detection device 110 may determine a time difference between an end of a frame time of the imaging device 115 and an arrival time of a next light pulse of an identified pulse sequence, and determine, based on the time difference, whether one or more non-light-pulse images may be captured before the next light pulse. In some cases, to facilitate a higher frame rate, as many intermediate, non-light-pulse images as possible may be triggered between two light-pulse images. In some aspects, in addition to maintaining a desired frame rate, having one or more non-light-pulse images captured between light-pulse images may facilitate detection (e.g., visual detection) of one or more light pulses, since the light pulse(s) may appear to be blinking in the sequence of images due to appearing in the light-pulse images and not appearing in the non-light-pulse images. Although the foregoing describes maintaining a higher frame rate for the imaging device 115 based on operation of the light pulse detection device 110, in other aspects, alternatively or in addition, the imaging device 115 may utilize data (e.g., timing information) from the light pulse detection device 110 and set a start of its integrating period(s) as appropriate to help maintain a desired frame rate of the imaging device 115.

In some cases, for pulse sequences having a pulse repetition rate or a minimum inter-pulse duration (e.g., minimum duration between any two temporally adjacent pulses) that approach the frame rate (e.g., 30 Hz, 60 Hz) of the imaging device 115, the pulse sequence may appear non-blinking (e.g., fixed) if the light pulses of the pulse sequence appear in each image captured by the imaging device 115. Non-blinking light signals may be more difficult to detect than blinking light signals. In these cases, there may not be sufficient time to trigger a non-light-pulse image between temporally adjacent light pulses of a pulse sequence while also capturing each light pulse of the pulse sequence. In some aspects, to facilitate detection of the light pulses in such cases, a light pulse of a pulse sequence may be periodically (e.g., intentionally) missed (e.g., missed every few frames). As one example, the light pulse detection device 110 may cause a pulse sequence to appear to be blinking (e.g., when corresponding images are displayed by the display device 120) by triggering the imaging device 115 to periodically miss a light pulse of the pulse sequence. As another example, the imaging device 115 may utilize data from the light pulse detection device 110 to determine a timing for integration periods of the imaging device 115 such that a light pulse of a light signal is intentionally missed to allow (e.g., force) a blinking light signal, such as a blinking laser spot. In some cases, a user may set a blink rate (e.g., desired minimum and/or maximum blink rate). Although some light pulses are ignored (e.g., intentionally missed, intentionally thrown away), detectability of a pulse sequence generally increases due to blinking of the pulse sequence.

While the foregoing is described with respect to the light pulse detection device 110 detecting a single pulse sequence in its field of view, in some aspects, the light pulse detection device 110 may be utilized to facilitate detection (e.g., tracking) of multiple pulse sequences. The light pulse detection device 110 may determine a respective pulse sequence associated with each detected light pulse, determine a respective time at which a next light pulse of each of the pulse sequences is to occur, and transmit data indicative of such times (e.g., via one or more data packets) to the imaging device 115. The imaging device 115 may capture one or more light-pulse images that include the light pulses according to the data from the light pulse detection device 110. In this regard, each of these light-pulse images may include at least one of the light signals. In some cases, the light pulse detection device 110 may cycle through a list of identified pulse sequences and trigger the imaging device 115 according to each identified pulse sequence. For example, each identified pulse sequence may be triggered in sequence. In some cases, the light pulse detection device 110 and/or the imaging device 115 may determine which pulse sequence is to be displayed (e.g., to a user) in an image. For example, the light pulse detection device 110 and/or the imaging device 115 may record a last time or last light pulse of a pulse sequence that has been captured and displayed, and capture (or cause to capture) light pulses of identified pulse sequences as appropriate to ensure that none of the pulse sequences go long (e.g., in terms of time and/or number of images) without being displayed. In some cases, alternative to or in addition to visual inspection, light pulses may be located in a scene by subtracting images captured by the imaging device 115, such as subtracting (e.g., pixel-by-pixel) a light-pulse image from a non-light-pulse image.

Thus, using various embodiments, the light pulse detection device 110 may allow the imaging device 115 to capture images that include light pulses associated with identified pulse sequences while maintaining a desired frame rate of the imaging device 115. In some cases, capturing of images that include light pulses may be facilitated even during daylight conditions, when generally a duration of integration periods is very short compared to a frame time. In this regard, a probability that a given light pulse arrives within an integration period of the imaging device 115 by chance is generally low. As such, while the imaging device 115 may integrate (e.g., collect light) for only a fraction of a frame time and thus a light pulse that arrives outside of an integration period is missed (e.g., does not appear in the image captured by the imaging device 115), operation of the light pulse detection device 110 and the imaging device 115 according to embodiments described herein allow detection and imaging of the light pulse.

Figure 2:
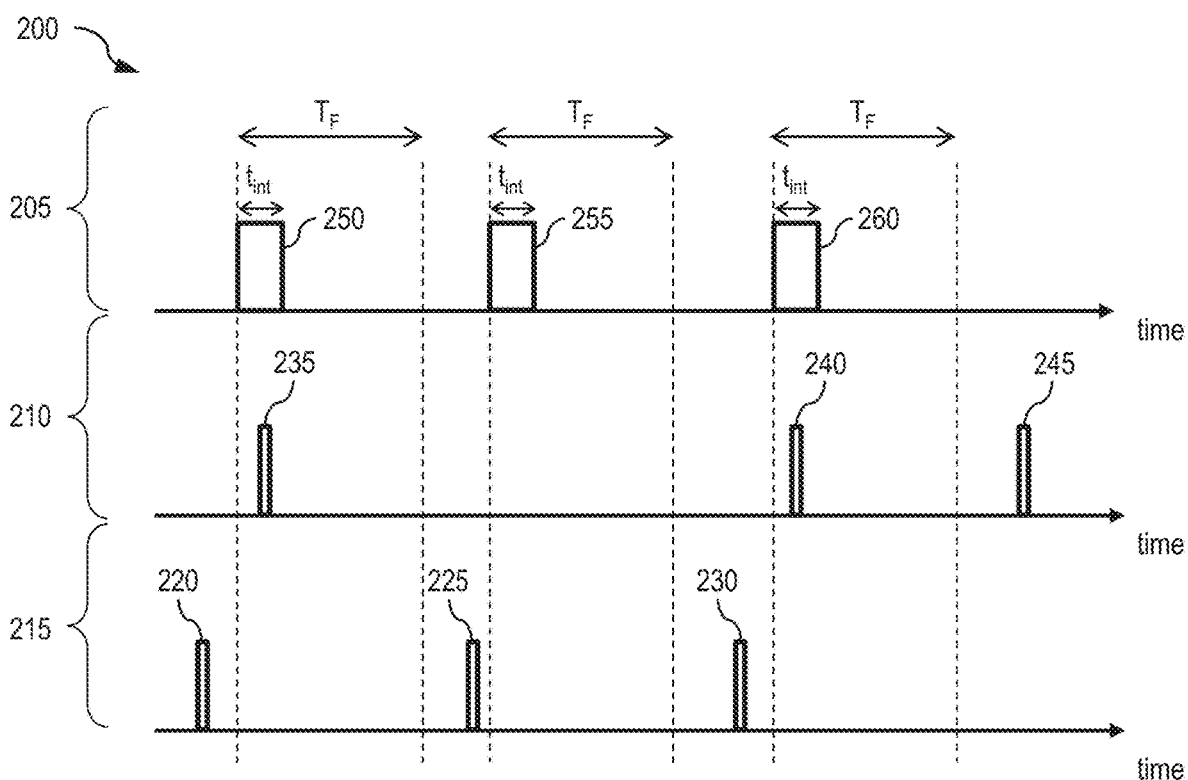
FIG. 2 illustrates an example of a timing diagram associated with operation of a light pulse detection device and an imaging device in association with a light source in accordance with one or more embodiments of the present disclosure.

FIG. 2 illustrates an example of a timing diagram 200 associated with operation of the light pulse detection device 110 and the imaging device 115 in association with the light source 105 in accordance with one or more embodiments of the present disclosure. The timing diagram 200 includes a portion 205, 210, and 215 associated with operation of the imaging device 115, the light source 105, and the light pulse detection device 110, respectively. The light pulse detection device 110 transmits trigger signals 220, 225, and 230. The trigger signal 220 may be generated and transmitted in response to the light pulse detection device 110 determining an arrival time of a light pulse 235 from the light source 105. In response to the trigger signal 220, the imaging device 115 determines an integration period 250 (e.g., determines a starting time of the integration period 250) and captures, using the integration period 250, an image that includes the light pulse 235. Similarly, the trigger signal 230 may be generated and transmitted to allow capture of a light pulse 240. In response to the trigger signal 230, the imaging device 115 determines an integration period 260 and captures, using the integration period 260, an image that includes the light pulse 240. The light pulse detection device 110 may generate and transmit the trigger signal 225 to cause the imaging device 115 to capture a non-light-pulse image. The non-light-pulse image may be captured by the light pulse detection device 110 using an integration period 255. A light pulse 245 is not captured by the imaging device 115. For example, the light pulse 245 may be intentionally missed. The light pulse 235 may be referred to as a temporally adjacent light pulse of the light pulse 240, and vice versa. Similarly, the light pulse 240 may be referred to as a temporally adjacent light pulse of the light pulse 245, and vice versa. In some cases, as shown in FIG. 2, a start time of a frame time coincides with a start time of an integration period. An example of a frame time $T_F$ may be around 30 ms and an example of a duration of an integration period tint may be around 10 µs.

Figure 3:
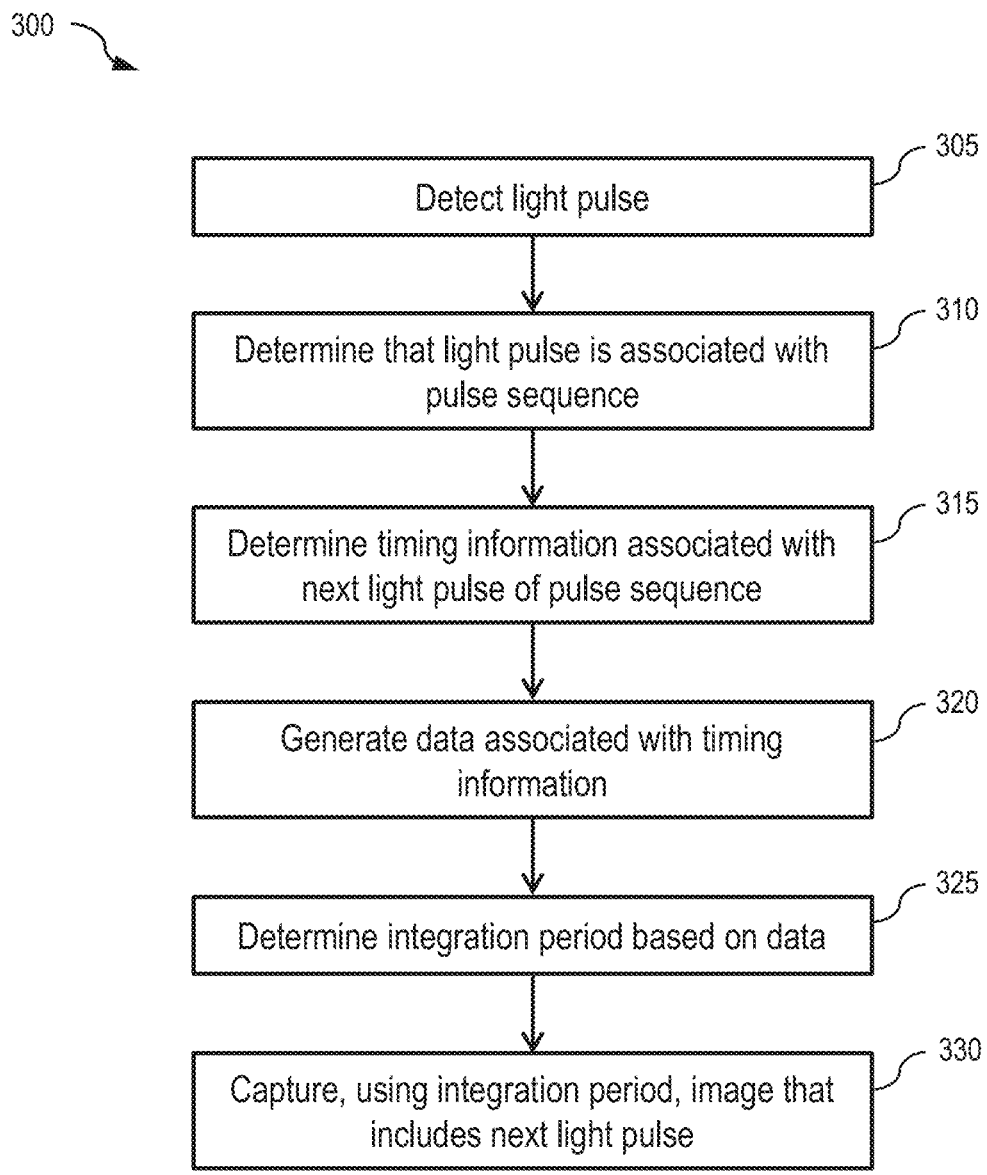
FIGS. 3 and 4 illustrate flow diagrams of examples of processes for facilitating pulse detection and synchronized pulse imaging in accordance with one or more embodiments of the present disclosure.

FIG. 3 illustrates a flow diagram of an example of a process 300 for facilitating pulse detection and synchronized pulse imaging in accordance with one or more embodiments of the present disclosure. For explanatory purposes, the process 300 is primarily described herein with reference to the environment 100 of FIG. 1. However, the process 300 can be performed in relation to other environments and associated components. Note that one or more operations in FIG. 3 may be combined, omitted, and/or performed in a different order as desired.

At block 305, the light pulse detection device 110 detects a light pulse. At block 310, the light pulse detection device 110 determines (e.g., identifies) that the light pulse is associated with a pulse sequence. In some cases, the light pulse detection device 110 may determine that the light pulse is associated with a pulse sequence based on a time difference between an arrival time (e.g., a detection time) of the light pulse and an arrival time of one or more light pulses prior to the light pulse detected at block 305. In some cases, the determination may be made further based on a time difference between arrival times of different ones of these preceding light pulses. In an aspect, the light pulse detection device 110 may make the determination based on a pulse repetition frequency associated with the light pulse and/or a listing of predetermined pulse sequences.

At block 315, the light pulse detection device 110 determines timing information associated with a next light pulse of the pulse sequence. The timing information may include a determined (e.g., estimated) arrival time associated with the next light pulse. In some cases, the timing information may include an arrival time of the next light pulse as well as one or more light pulses of the pulse sequence subsequent to the next light pulse. At block 320, the light pulse detection device 110 generates data associated with (e.g., indicative of) the timing information. At block 325, the imaging device 115 determines an integration period (e.g., determines a starting time for the integration period) based on the data from the light pulse detection device 110. In some cases, the imaging device 115 may determine multiple integration periods based on the data. In these cases, the data from the light pulse detection device 110 may include sufficient information from which the imaging device 115 may determine multiple integration periods. At block 330, the imaging device 115 captures, using the integration period, an image that includes the next light pulse.

In some cases, the data may be a control signal (e.g., a trigger signal) that, upon its receipt by the imaging device 115, causes the imaging device 115 to start an integration period. A user may set an amount of time between receipt of the data by the imaging device 115 and a start of the integration period. In these cases, the data may, but need not, include an indication of an arrival time of the next light pulse. In other cases, the data may include an indication of an arrival time of the next light pulse. In an aspect, the imaging device 115 may set a start time for an integration period autonomously based on the data from the light pulse detection device 110.

Figure 4:
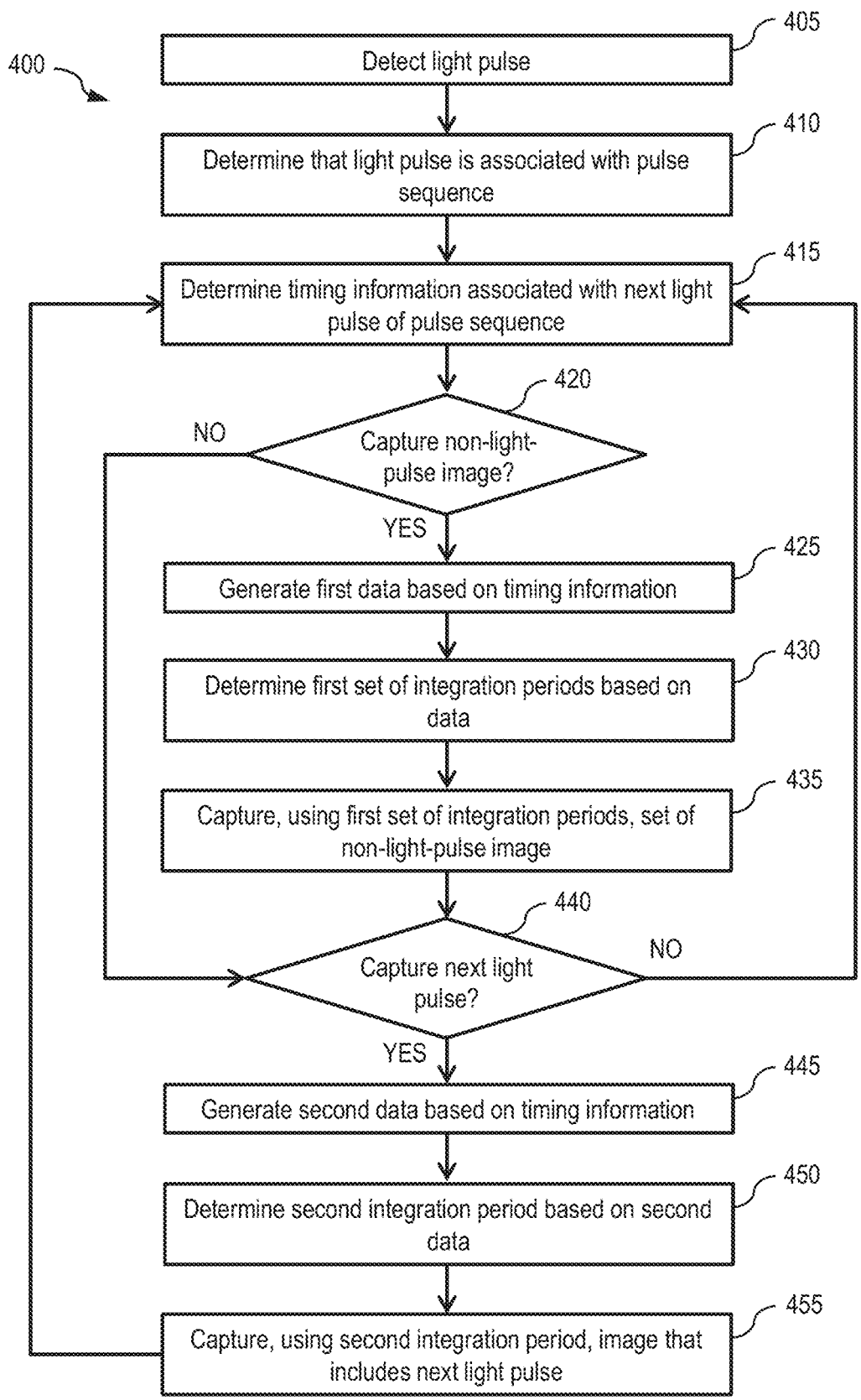

FIG. 4 illustrates a flow diagram of an example of a process 400 for facilitating pulse detection and synchronized pulse imaging in accordance with one or more embodiments of the present disclosure. For explanatory purposes, the process 400 is primarily described herein with reference to the environment 100 of FIG. 1. However, the process 400 can be performed in relation to other environments and associated components. Note that one or more operations in FIG. 4 may be combined, omitted, and/or performed in a different order as desired.

At block 405, the light pulse detection device 110 detects a light pulse. At block 410, the light pulse detection device 110 determines (e.g., identifies) that the light pulse is associated with a pulse sequence. At block 415, the light pulse detection device 110 determines timing information associated with a next light pulse of the pulse sequence. The timing information may include a determined (e.g., estimated) arrival time associated with the next light pulse. In some cases, the timing information may include an arrival time of the next light pulse as well as one or more light pulses of the pulse sequence subsequent to the next light pulse.

At block 420, the light pulse detection device 110 determines whether to capture one or more non-light-pulse images. In an aspect, the light pulse detection device 110 may determine, based at least on the timing information, whether there is sufficient time to capture one or more non-light-pulse images prior to a determined arrival time associated with the next light pulse. Capturing of non-light-pulse images may allow the imaging device 115 to operate at a higher frame rate and, in some cases, facilitate detection (e.g., visual detection) of light pulses (e.g., due to blinking). In some cases, the determination may be made based on a desired frame rate of the imaging device 115.

If the determination is to capture one or more non-light-pulse images, the process 400 proceeds to block 425. At block 425, the light pulse detection device 110 generates data based on the timing information. At block 430, the imaging device 115 determines one or more integration periods based on the data. In this regard, each non-light-pulse image to be captured is associated with an integration period. At block 435, the imaging device 115 captures one or more non-light-pulse images using the integration period(s). In some cases, the data may be a control signal (e.g., a trigger signal) that, upon its receipt by the imaging device 115, causes the imaging device 115 to start an integration period. A user may set an amount of time between receipt of the data by the imaging device 115 and a start of the integration period. In some cases, the imaging device 115 may set a start time for an integration period autonomously based on the data from the light pulse detection device 110.

At block 440, the light pulse detection device 110 determines whether to capture the next light pulse of the pulse sequence. In an aspect, the light pulse detection device 110 may determine whether to capture the next light pulse based on whether light pulses of the pulse sequence are displayed (e.g., in images presented to a user) as blinking. A pulse sequence that appears to a user as blinking is generally easier to be detected by the user than a non-blinking signal. In some cases, the determination may be to capture the next light pulse of the pulse sequence if previous light pulses of the pulse sequence have been displayed as blinking. In an aspect, the light pulse detection device 110 may determine a number of consecutive light pulses of the pulse sequence that have been captured in images and, based on this number, selectively cause the imaging device 115 to capture an image that includes the next light pulse of the pulse sequence.

If the determination is to capture the next light pulse, the process 400 proceeds to block 445. At block 445, the light pulse detection device 110 generates data based on the timing information (e.g., determined at block 415). The description of the data described with respect to block 425 may also apply for the data generated at block 445. At block 450, the imaging device 115 determines an integration period based on the data received at block 445. At block 455, the imaging device 115 captures an image that includes the next light pulse using the integration period determined at block 450. The process 400 then proceeds to block 415, in which timing information is determined for a subsequent light pulse of the identified pulse sequence.

If the determination at block 420 is not to capture one or more non-light-pulse images, the process 400 proceeds to block 440. If the determination at block 440 is not to capture the next light pulse, the process 400 proceeds to block 415, in which timing information is determined for a subsequent light pulse of the identified pulse sequence.

Although the foregoing describes the processes 300 and 400 in relation to light pulses of a single pulse sequence being detected and imaged, in other embodiments the processes 300 and 400 can be applied in the case that light pulses from multiple pulse sequences may be simultaneously accommodated by the light pulse detection device 110 and the imaging device 115. In some cases, such as at block 440 of FIG. 4, the light pulse detection device 110 may determine whether to capture a next light pulse of a first pulse sequence based on captured images that include pulses of the first pulse sequence in relation to captured images that include pulses of other pulse sequences. In an aspect, for a given pulse sequence, the light pulse detection device 110 may determine a number of consecutive images captured by the imaging device 115 that do not include any light pulse associated with the given pulse sequence, and, based on this number, selectively cause the imaging device 115 to capture an image that includes a light pulse of the given pulse sequence. For example, when the number exceeds a threshold (e.g., the given pulse sequence has not been included in a sufficiently high number of consecutive images), the light pulse detection device 110 may cause the imaging device 115 to capture an image that includes a light pulse of the given pulse sequence. In some cases, alternative to or in addition to making the determination based on a number of consecutive images, the determination may be made based on an amount of time that has elapsed since a light pulse of the given pulse sequence has been captured.

Figure 5:
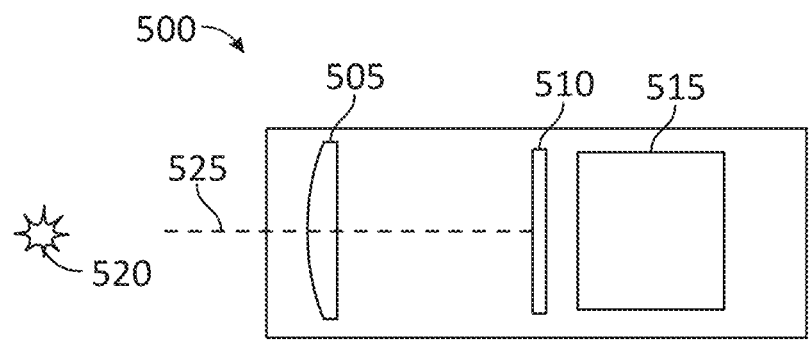
FIG. 5 illustrates an example of a light pulse detection device in accordance with one or more embodiments of the present disclosure.

FIG. 5 illustrates an example of a light pulse detection device 500 in accordance with one or more embodiments of the present disclosure. Not all of the depicted components may be required, however, and one or more embodiments may include additional components not shown in FIG. 5. Variations in the arrangement and type of the components may be made without departing from the spirit or scope of the claims as set forth herein. Additional, fewer, and/or different components may be provided. In an embodiment, the light pulse detection device 500 may be, may include, or may be a part of the light pulse detection device 110 of FIG. 1.

The light pulse detection device 500 includes optics 505, a detector 510, and supporting electronics 515. The supporting electronics 515 may include a processor circuit (e.g., to process data captured by the detector 510) and a communication circuit (e.g., to transmit data to an imaging device 115). The light pulse detection device 500 can receive a light pulse from a light source 520. The optics 505 can collect light from the light source 520 and direct the light to the detector 510. In one case, the light source 520 may be an emitter of a pulse sequence. As an example, light pulses of the pulse sequence may be laser spots having a certain wavelength or wavelength range (e.g., MWIR). In another case, the light source 520 may be an object that reflects light pulses of a pulse sequence. For example, the light source 520 may be a building onto which a light pulse is incident, and the light pulse received by the light pulse detection device 500 may be a reflection of the light pulse. In some cases, the detector 510 may be sealed inside a vacuum dewar and cryogenically cooled to increase sensitivity.

The optics 505 and the detector 510 may be arranged to facilitate measurement (e.g., determination) of a direction of one or more light signals (e.g., MWIR laser spots) in a field of view of the light pulse detection device 500. The optics 505 may have properties (e.g., material properties, shapes, sizes) appropriate for a wavelength range associated with the light source 520. In some cases, the light pulse detection device 500 may provide information associated with a detected light signal(s), such as light signal position information, pulse rate information, and/or predictive timing pulses suitable to trigger an imaging device to image the light pulse(s). In some cases, the supporting electronics 515 may be utilized to generate and/or transmit the information to another device, such as an imaging device and/or a display device. Although the optics 505 of FIG. 5 is illustrated as a single lens for directing light to the detector 510, in other embodiments, the optics 505 may include one or more optical elements alternative to or in addition to the lens shown in FIG. 5. The optical element(s) may include one or more lenses, mirrors, beam splitters, beam couplers, and/or other elements appropriately arranged to direct EM radiation to the detector 510.

Figure 6:
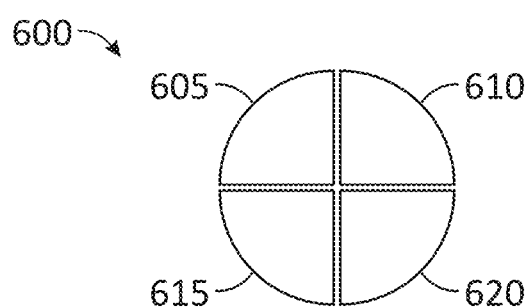
FIG. 6 illustrates a front view of a quadrant detector in accordance with one or more embodiments of the present disclosure.

In an embodiment, the detector 510 is a quadrant detector that includes four cells (e.g., also referred to as quad cells, photodiode quadrants, and quadrants). It is noted that the detector 510 may be another type of appropriate detector for facilitating detection of light pulses. FIG. 6 illustrates a front view of a quadrant detector 600 in accordance with one or more embodiments of the present disclosure. For explanatory purposes, the detector 510 is implemented by the quadrant detector 600. The quadrant detector 600 includes quad cells 605, 610, 615, and 620. In some cases, the optics 505 may soft focus (e.g., semi-focus) light pulses from the light source 520 such that some light falls onto each of the quad cells 605, 610, 615, and 620. A cell may also be referred to as an element or a segment. A direction of the light source 520 relative to an optical axis 525 of the light pulse detection device 500 is calculated from photocurrents from the four quad cells 605, 610, 615, and 620. A photocurrent of the quad cells 605, 610, 615, and 620 is denoted below as $I_1$, $I_2$, $I_3$, and $I_4$, respectively. A horizontal direction and a vertical direction of the light source 520 relative to the optical axis 525 of the light pulse detection device 500 may be provided by an azimuth angle and an elevation angle, respectively. The horizontal direction may be calculated based on a difference in photocurrent between the left two quad cells 605 and 615 and the right two quad cells 610 and 620, while the vertical direction may be calculated based on a difference in photocurrent between an upper two quad cells 605 and 610 and the lower two quad cells 615 and 620. Equations below provide examples for providing the horizontal direction (e.g., azimuth angle) and the vertical direction (e.g., elevation angle):

$$\text{Azimuth angle} = f_1 \frac{(\text{Sum of left quads}) - (\text{Sum of right quads})}{\text{Sum of all quads}} = f_1 \frac{(I_1 + I_3) - (I_2 + I_4)}{I_1 + I_2 + I_3 + I_4}$$

$$\text{Elevation angle} = f_2 \frac{(\text{Sum of lower quads}) - (\text{Sum of upper quads})}{\text{Sum of all quads}} = f_2 \frac{(I_3 + I_4) - (I_1 + I_2)}{I_1 + I_2 + I_3 + I_4}$$

where $f_1$ and $f_2$ are calibration functions determined by system design. In an aspect, the azimuth angle and the elevation angle may be calculated by the processor circuit of the supporting electronics 515.

FIGS. 7A and 7B illustrate an example in which a light source 705 is along the optical axis 525 of the light pulse detection device 500, in which case a light pulse 710 falls equally (e.g., substantially equally) into each of the quad cells 605, 610, 615, and 620. FIG. 7A illustrates the light source 705 in relation to the light pulse detection device 500. FIG. 7B illustrates the light pulse 710 that has been focused (e.g., soft focused) by the optics 505 onto the detector 510.

FIGS. 8A and 8B illustrate an example in which a light source 805 is above the optical axis 525 of the light pulse detection device 500, in which case more of a light pulse 810 falls on the quad cells 615 and 620 (i.e., the lower two quad cells) than on the quad cells 605 and 610 (i.e., the upper two quad cells). FIG. 8A illustrates the light source 805 in relation to the light pulse detection device 500. FIG. 8B illustrates the light pulse 810 that has been focused by the optics 505 onto the detector 510.

Figure 9A:
FIG. 9A illustrates an example of an image.
Figure 9B:
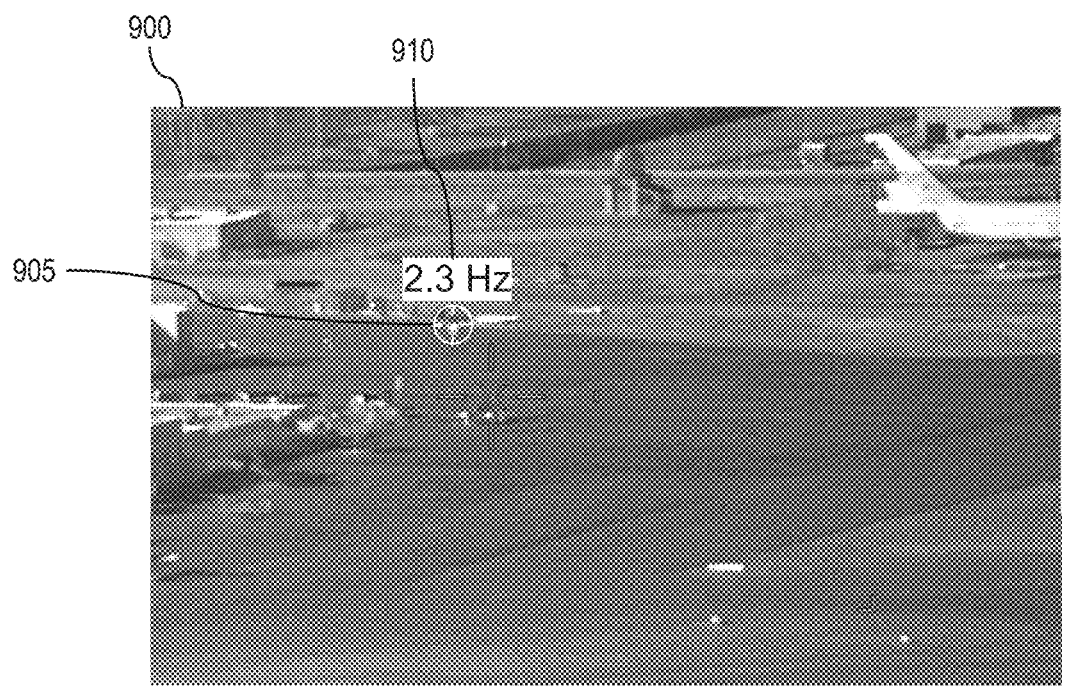
FIG. 9B illustrates the image of FIG. 9A with information overlaid on the image in accordance with one or more embodiments of the present disclosure.

FIG. 9A illustrates an example of an image 900 (e.g., MWIR image) generated by an imaging device (e.g., the imaging device 115) and provided for display by a display device (e.g., the display device 120), such as to a user. FIG. 9B illustrates the image 900 of FIG. 9A with information associated with a light source provided with the image 900, in accordance with one or more embodiments of the present disclosure. As an example, the light source may be an MWIR beacon. The information may be overlaid or otherwise combined with the image 900. In some cases, the image 900 may be one among a series of sequentially captured images (e.g., a video). In video, the light source may emit a light signal that blinks (e.g., due to one or more non-light-pulse images between any two light-pulse images). In some cases, while such blinking facilitates visual detection of the light signal, such a blinking signal may be difficult to detect by eye due to, for example, a short duration generally allocatable to observing the display device (e.g., display device may be observed by a user via quick glances) and a busy background (e.g., a scene that includes the blinking signal).

In FIG. 9B, a position of the light source is highlighted using a graphical overlay 905 (e.g., crosshair in FIG. 9A) and a blink rate (e.g., 2.3 Hz in FIG. 9B) associated with the light source reported using a textual overlay 910 (e.g., with a white box around the text to enhance visibility of the text). In an aspect, a light pulse detection device (e.g., the light pulse detection device 500) may provide light signal position information, pulse rate information, and/or predictive timing pulses to the imaging device to facilitate capture of the image 900. The imaging device and/or the light pulse detection device may generate the graphical overlay 905 and the textual overlay 910 and provide (e.g., combine) the graphical overlay 905 and the textual overlay 910 with the image 900. In some cases, one or more overlays may have a color, size, and/or shape that maximize their respective contrast with respect to the scene. In some cases, a light pulse detection device (e.g., the light pulse detection device 110 of FIG. 1) may utilize a determined pulse repetition rate and/or an identified pulse sequence to predict an arrival of a next light pulse and send a trigger to an imaging device (e.g., the imaging device 115) such that a light pulse falls within the imaging device's integration window, further improving visual detection of the light pulse. In some cases, alternatively or in addition to information from the light pulse detection device, machine vision may be implemented in which light pulses may be located in a scene by subtracting images captured by the imaging device, such as subtracting (e.g., pixel-by-pixel) a light-pulse image from a non-light-pulse image, to locate light pulses of pulse sequences.

Although the foregoing description utilizes a quadrant detector as a light pulse detection device, a light pulse detection device may be implemented using other detectors (e.g., other multi-element/multi-segment detectors). In the example of a multi-element detector, a light pulse detection device may include fewer or more than four elements, and/or the element(s) may be arranged differently from that shown in FIGS. 6, 7B, and 8B. In some cases, the elements may be of one or more different sizes and/or shapes. In some aspects, the light pulse detection device may be implemented generally using a position sensitive device or otherwise a device capable of determining (e.g., estimating) a location of a light pulse (e.g., azimuth angle, elevation angle) based on one or more signals (e.g., photocurrents, voltages, etc.) generated by a detector of the light pulse detection device in response to the light pulse.

Figure 10:
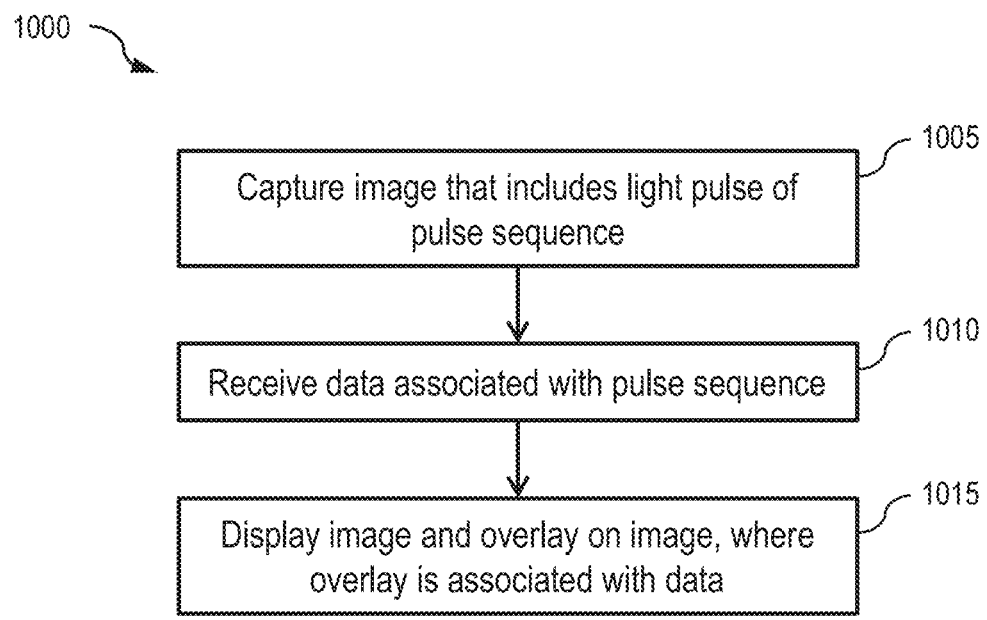
FIG. 10 illustrates a flow diagram of an example of a process for facilitating of displaying light pulses and associated information in accordance with one or more embodiments of the present disclosure.

FIG. 10 illustrates a flow diagram of an example of a process 1000 for facilitating displaying of light pulses and associated information in accordance with one or more embodiments of the present disclosure. For explanatory purposes, the process 1000 is primarily described herein with reference to the environment 100 of FIG. 1. However, the process 1000 can be performed in relation to other environments and associated components. Note that one or more operations in FIG. 10 may be combined, omitted, and/or performed in a different order as desired. In an embodiment, the process 1000 is performed in association with the processes 300 and/or 400 of FIGS. 3 and 4, respectively.

At block 1005, the imaging device 1005 captures an image that includes a light pulse of a pulse sequence. In an embodiment, the imaging device 1005 may capture the image by performing block 330 of FIG. 3 or block 455 of FIG. 4.

At block 1010, the display device 120 receives data associated with the pulse sequence. The display device 120 may receive the data from the light pulse detection device 110 and/or the imaging device 115. As an example, the data may include a location of the light pulse associated with the pulse sequence and/or a pulse repetition frequency (if applicable) associated with the pulse sequence. For instance, the data may be, or may be based on, an azimuth angle and an elevation angle determined by the light pulse detection device 110 and provided by the light pulse detection device 110 to the imaging device 115 and/or the display device 120. In some cases, the data may be, or may be used to derive, an overlay to be provided on the image.

At block 1015, the display device 120 displays the image and an overlay on the image. The overlay is associated with the data. As an example, the location of the light pulse associated may be provided as a graphical overlay (e.g., the graphical overlay 905) on the image (e.g., the image 900). In some cases, the overlay may be received as the data by the display device 120 at block 1010. For example, the overlay may be generated by the light pulse detection device 110 and/or the imaging device 115 and provided to the display device 120. Alternatively or in addition, in some cases, the display device 120 generates the overlay based on the received data.

In some embodiments, once a pulse sequence has been detected, the display device 120 may continue to display an overlay(s) on images displayed to a user at least until such time that an associated pulse sequence is no longer being detected. In some cases, the overlay(s) may remain on images displayed to the user even after the associated pulse sequence is no longer being detected, since a determination as to why the pulse sequence is no longer being detected may need to be performed. In this regard, the overlay(s) may be overlaid on non-light-pulse images. For instance, the display device 120 may display, during a first time duration, a first image and an overlay on the first image; display, during a second time duration subsequent to the first time duration, one or more non-light-pulse images and the overlay on each of the non-light-pulse image(s); and display, during a third time duration subsequent to the second time duration, a second image and the overlay on the second image. A user may be benefited from seeing (e.g., via visual inspection) a visual cue, such as a graphical overlay and/or a textual overlay, associated with a light pulse that is expected to be present in a subsequent image (e.g., a later image to be captured as part of video data). In cases that light pulses of multiple pulse sequences have been detected, overlay(s) associated with each pulse sequence may be provided on images displayed to the user.

In some embodiments, the light pulse detection device may provide data (e.g., laser spot position information, pulse rate information, predictive timing pulses, etc.) to one or more devices. Although the foregoing describes the light pulse detection device (e.g., 110) providing (e.g., transmitting) data to an imaging device (e.g., 115) and/or a display device (e.g., 120), the light pulse detection device may, alternatively or in addition, provide the data to a device different from the imaging device and the display device. For example, the data may be provided to a gimbal or an associated device (e.g., a gimbal controller device) to direct a gimbal viewpoint onto a light pulse (e.g., of a light pulse sequence) without imaging or displaying the light pulse.

Figure 11:
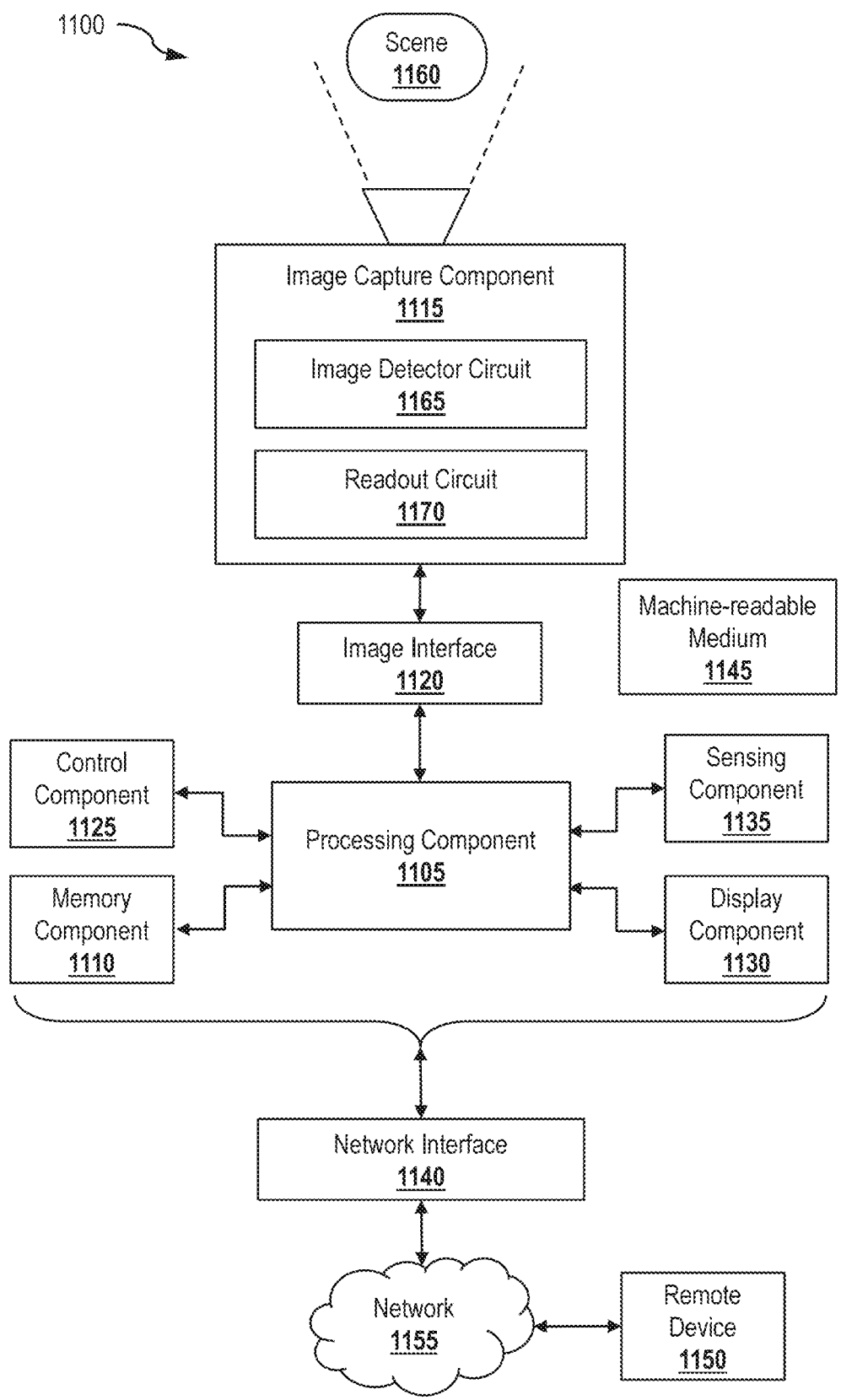
FIG. 11 illustrates a block diagram of an example of an imaging system in accordance with one or more embodiments of the present disclosure.

FIG. 11 illustrates a block diagram of an example of an imaging system 1100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the imaging system 1100 may be, may include, or may be a part of the imaging device 115 of FIG. 1.

The imaging system 1100 may be utilized for capturing and processing images in accordance with an embodiment of the disclosure. The imaging system 1100 may represent any type of imaging system that detects one or more ranges (e.g., wavebands) of EM radiation and provides representative data (e.g., one or more still image frames or video image frames). The imaging system 1100 may include a housing that at least partially encloses components of the imaging system 1100, such as to facilitate compactness and protection of the imaging system 1100. For example, the solid box labeled 1100 in FIG. 11 may represent the housing of the imaging system 1100. The housing may contain more, fewer, and/or different components of the imaging system 1100 than those depicted within the solid box in FIG. 11. In an embodiment, the imaging system 1100 may include a portable device and may be incorporated, for example, into a vehicle or a non-mobile installation requiring images to be stored and/or displayed. The vehicle may be a land-based vehicle (e.g., automobile), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 1100. In another example, the imaging system 1100 may be coupled to various types of fixed locations (e.g., a home security mount, a campsite or outdoors mount, or other location) via one or more types of mounts.

The imaging system 1100 includes, according to one implementation, a processing component 1105, a memory component 1110, an image capture component 1115, an image interface 1120, a control component 1125, a display component 1130, a sensing component 1135, and/or a network interface 1140. The processing component 1105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 1105 may be configured to interface and communicate with the various other components (e.g., 1110, 1115, 1120, 1125, 1130, 1135, etc.) of the imaging system 1100 to perform such operations. For example, the processing component 1105 may be configured to process captured image data received from the image capture component 1115, store the image data in the memory component 1110, and/or retrieve stored image data from the memory component 1110. In one aspect, the processing component 1105 may be configured to perform various system control operations (e.g., to control communications and operations of various components of the imaging system 1100) and other image processing operations (e.g., data conversion, video analytics, etc.).

The memory component 1110 includes, in one embodiment, one or more memory devices configured to store data and information, including infrared image data and information. The memory component 1110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 1105 may be configured to execute software instructions stored in the memory component 1110 so as to perform method and process steps and/or operations. The processing component 1105 and/or the image interface 1120 may be configured to store in the memory component 1110 images or digital image data captured by the image capture component 1115. The processing component 1105 may be configured to store processed still and/or video images in the memory component 1110.

In some embodiments, a separate machine-readable medium 1145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 1145 may be portable and/or located separate from the imaging system 1100, with the stored software instructions and/or data provided to the imaging system 1100 by coupling the machine-readable medium 1145 to the imaging system 1100 and/or by the imaging system 1100 downloading (e.g., via a wired link and/or a wireless link) from the machine-readable medium 1145. It should be appreciated that various modules may be integrated in software and/or hardware as part of the processing component 1105, with code (e.g., software or configuration data) for the modules stored, for example, in the memory component 1110.

The imaging system 1100 may represent an imaging device, such as a video and/or still camera, to capture and process images and/or videos of a scene 1160. In this regard, the image capture component 1115 of the imaging system 1100 may be configured to capture images (e.g., still and/or video images) of the scene 1160 in a particular spectrum or modality. The image capture component 1115 includes an image detector circuit 1165 (e.g., a thermal infrared detector circuit) and a readout circuit 1170 (e.g., an ROIC). For example, the image capture component 1115 may include an IR imaging sensor (e.g., IR imaging sensor array) configured to detect IR radiation in the near, middle, and/or far IR spectrum and provide IR images (e.g., IR image data or signal) representative of the IR radiation from the scene 1160. For example, the image detector circuit 1165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, MWIR radiation (e.g., EM radiation with wavelength of 3 µm to 5 µm) and/or LWIR radiation (e.g., EM radiation with wavelength of 7 µm to 14 µm), or any desired IR wavelengths (e.g., generally in the 0.7 µm to 14 µm range). In other aspects, the image detector circuit 1165 may capture radiation from one or more other wavebands of the EM spectrum, such as visible-light, ultraviolet light, and so forth. In an embodiment, the image capture component 1115 may be, may include, or may be a part of the imaging device 115 of FIG. 1.

The image detector circuit 1165 may capture image data associated with the scene 1160. To capture the image, the image detector circuit 1165 may detect image data of the scene 1160 (e.g., in the form of EM radiation) and generate pixel values of the image based on the scene 1160. In some cases, the image detector circuit 1165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting example, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

In an aspect, the imaging system 1100 (e.g., the image capture component 1115 of the imaging system 1100) may include one or more optical elements (e.g., mirrors, lenses, beamsplitters, beam couplers, etc.) to direct EM radiation to the image detector circuit 1165. In some cases, an optical element may be at least partially within the housing of the imaging system 1100.

The image may be, or may be considered, a data structure that includes pixels and is a representation of the image data associated with the scene 1160, with each pixel having a pixel value that represents EM radiation emitted or reflected from a portion of the scene and received by a detector that generates the pixel value. Based on context, a pixel may refer to a detector of the image detector circuit 1165 that generates an associated pixel value or a pixel (e.g., pixel location, pixel coordinate) of the image formed from the generated pixel values.

In an aspect, the pixel values generated by the image detector circuit 1165 may be represented in terms of digital count values generated based on the electrical signals obtained from converting the detected radiation. For example, in a case that the image detector circuit 1165 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 1165 (e.g., an IR image detector circuit) is associated with higher digital count values and higher temperatures.

The readout circuit 1170 may be utilized as an interface between the image detector circuit 1165 that detects the image data and the processing component 1105 that processes the detected image data as read out by the readout circuit 1170, with communication of data from the readout circuit 1170 to the processing component 1105 facilitated by the image interface 1120. An image capturing frame rate may refer to the rate (e.g., images per second) at which images are detected in a sequence by the image detector circuit 1165 and provided to the processing component 1105 by the readout circuit 1170. The readout circuit 1170 may read out the pixel values generated by the image detector circuit 1165 in accordance with an integration time (e.g., also referred to as an integration period).

In various embodiments, a combination of the image detector circuit 1165 and the readout circuit 1170 may be, may include, or may together provide an FPA. In some aspects, the image detector circuit 1165 may be a thermal image detector circuit that includes an array of microbolometers, and the combination of the image detector circuit 1165 and the readout circuit 1170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 1115 may include one or more filters adapted to pass radiation of some wavelengths but substantially block radiation of other wavelengths. For example, the image capture component 1115 may be an IR imaging device that includes one or more filters adapted to pass IR radiation of some wavelengths while substantially blocking IR radiation of other wavelengths (e.g., MWIR filters, thermal IR filters, and narrowband filters). In this example, such filters may be utilized to tailor the image capture component 1115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 1115 may include an IR imaging sensor having an FPA of detectors responsive to IR radiation including near infrared (NIR), SWIR, MWIR, long-wave IR (LWIR), and/or very-long wave IR (VLWIR) radiation. In some other embodiments, alternatively or in addition, the image capture component 1115 may include a complementary metal oxide semiconductor (CMOS) sensor or a charge-coupled device (CCD) sensor that can be found in any consumer camera (e.g., visible light camera).

Other imaging sensors that may be embodied in the image capture component 1115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 1115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 1120 may include, in some embodiments, appropriate input ports, connectors, switches, and/or circuitry configured to interface with external devices (e.g., a remote device 1150 and/or other devices) to receive images (e.g., digital image data) generated by or otherwise stored at the external devices. The received images or image data may be provided to the processing component 1105. In this regard, the received images or image data may be converted into signals or data suitable for processing by the processing component 1105. For example, in one embodiment, the image interface 1120 may be configured to receive analog video data and convert it into suitable digital data to be provided to the processing component 1105.

In some embodiments, the image interface 1120 may include various standard video ports, which may be connected to a video player, a video camera, or other devices capable of generating standard video signals, and may convert the received video signals into digital video/image data suitable for processing by the processing component 1105. In some embodiments, the image interface 1120 may also be configured to interface with and receive images (e.g., image data) from the image capture component 1115. In other embodiments, the image capture component 1115 may interface directly with the processing component 1105.

The control component 1125 includes, in one embodiment, a user input and/or an interface device, such as a rotatable knob (e.g., potentiometer), push buttons, slide bar, keyboard, and/or other devices, that is adapted to generate a user input control signal. The processing component 1105 may be configured to sense control input signals from a user via the control component 1125 and respond to any sensed control input signals received therefrom. The processing component 1105 may be configured to interpret such a control input signal as a value, as generally understood by one skilled in the art. In one embodiment, the control component 1125 may include a control unit (e.g., a wired or wireless handheld control unit) having push buttons adapted to interface with a user and receive user input control values. In one implementation, the push buttons of the control unit may be used to control various functions of the imaging system 1100, such as autofocus, menu enable and selection, field of view, brightness, contrast, noise filtering, image enhancement, and/or various other features of an imaging system or camera.

The display component 1130 includes, in one embodiment, an image display device (e.g., a liquid crystal display (LCD)) or various other types of generally known video displays or monitors. In an embodiment, the display component 1130 may be, may include, or may be a part of the display device 120 of FIG. 1. The processing component 1105 may be configured to display image data and information on the display component 1130. The processing component 1105 may be configured to retrieve image data and information from the memory component 1110 and display any retrieved image data and information on the display component 1130. The display component 1130 may include display circuitry, which may be utilized by the processing component 1105 to display image data and information. The display component 1130 may be adapted to receive image data and information directly from the image capture component 1115, processing component 1105, and/or image interface 1120, or the image data and information may be transferred from the memory component 1110 via the processing component 1105.

The sensing component 1135 includes, in one embodiment, one or more sensors of various types, depending on the application or implementation requirements, as would be understood by one skilled in the art. Sensors of the sensing component 1135 provide data, and/or information to at least the processing component 1105. In one aspect, the processing component 1105 may be configured to communicate with the sensing component 1135. In various implementations, the sensing component 1135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 1135 may represent conventional sensors as generally known by one skilled in the art for monitoring various conditions (e.g., environmental conditions) that may have an effect (e.g., on the image appearance) on the image data provided by the image capture component 1115.

In some implementations, the sensing component 1135 (e.g., one or more sensors) may include devices that relay information to the processing component 1105 via wired and/or wireless communication. For example, the sensing component 1135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 1105 can use the information (e.g., sensing data) retrieved from the sensing component 1135 to modify a configuration of the image capture component 1115 (e.g., adjusting a light sensitivity level, adjusting a direction or angle of the image capture component 1115, adjusting an aperture, etc.).

In some embodiments, various components of the imaging system 1100 may be distributed and in communication with one another over a network 1155. In this regard, the imaging system 1100 may include a network interface 1140 configured to facilitate wired and/or wireless communication among various components of the imaging system 1100 over the network 1155. In such embodiments, components may also be replicated if desired for particular applications of the imaging system 1100. That is, components configured for same or similar operations may be distributed over a network. Further, all or part of any one of the various components may be implemented using appropriate components of the remote device 1150 (e.g., a conventional digital video recorder (DVR), a computer configured for image processing, and/or other device) in communication with various components of the imaging system 1100 via the network interface 1140 over the network 1155, if desired. Thus, for example, all or part of the processing component 1105, all or part of the memory component 1110, and/or all of part of the display component 1130 may be implemented or replicated at the remote device 1150. In some embodiments, the imaging system 1100 may not include imaging sensors (e.g., image capture component 1115), but instead receive images or image data from imaging sensors located separately and remotely from the processing component 1105 and/or other components of the imaging system 1100. It will be appreciated that many other combinations of distributed implementations of the imaging system 1100 are possible, without departing from the scope and spirit of the disclosure.

Furthermore, in various embodiments, various components of the imaging system 1100 may be combined and/or implemented or not, as desired or depending on the application or requirements. In one example, the processing component 1105 may be combined with the memory component 1110, image capture component 1115, image interface 1120, display component 1130, sensing component 1135, and/or network interface 1140. In another example, the processing component 1105 may be combined with the image capture component 1115, such that certain functions of processing component 1105 are performed by circuitry (e.g., a processor, a microprocessor, a logic device, a microcontroller, etc.) within the image capture component 1115.

Figure 12:
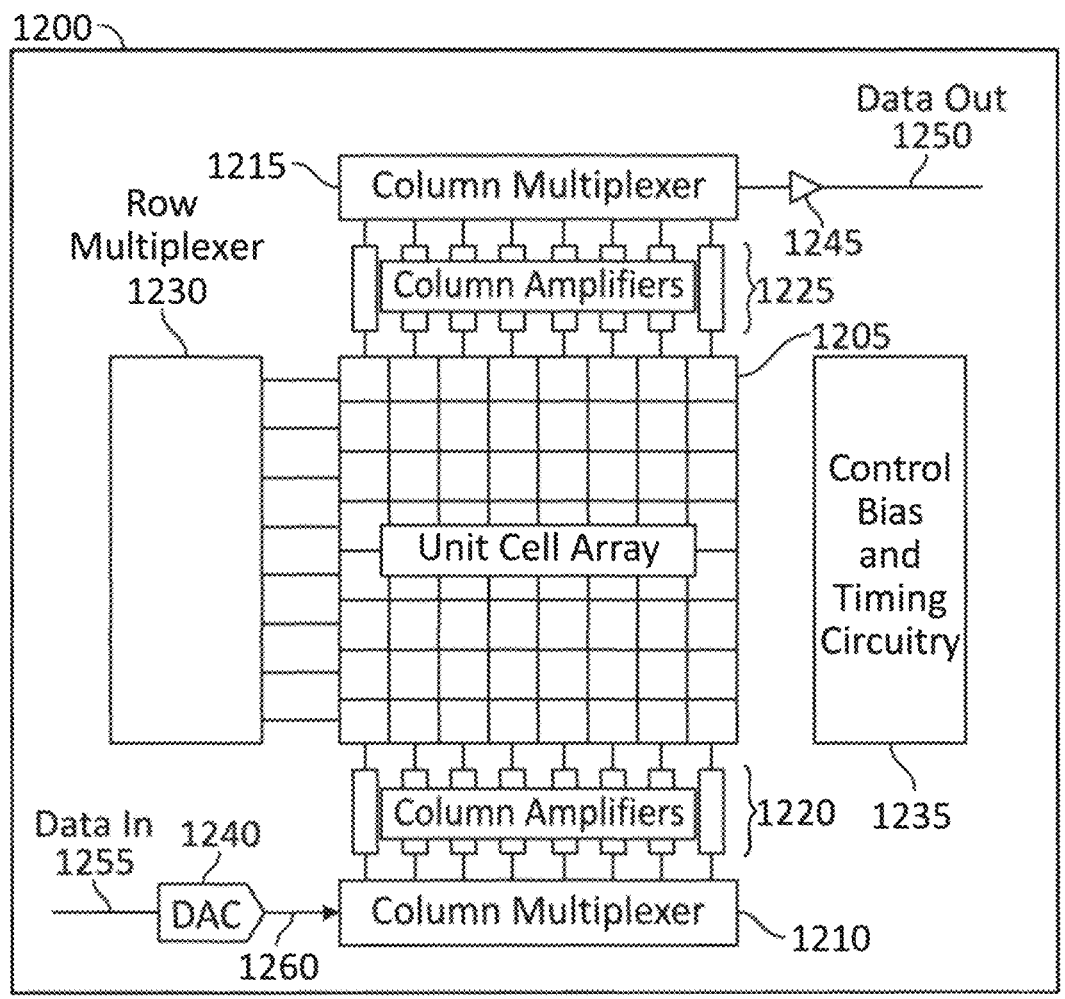
FIG. 12 illustrates a block diagram of an example of an image sensor assembly in accordance with one or more embodiments of the present disclosure.

FIG. 12 illustrates a block diagram of an example of an image sensor assembly 1200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 1200 may be an FPA, for example, implemented as the image capture component 1115 of FIG. 11.

The image sensor assembly 1200 includes a unit cell array 1205, column multiplexers 1210 and 1215, column amplifiers 1220 and 1225, a row multiplexer 1230, control bias and timing circuitry 1235, a digital-to-analog converter (DAC) 1240, and a data output buffer 1245. The unit cell array 1205 includes an array of unit cells. In an aspect, each unit cell may include a detector and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 1215, column amplifiers 1220, row multiplexer 1230, and data output buffer 1245 may be used to provide the output signals from the unit cell array 1205 as a data output signal on a data output line 1250. The data output signal may be an image formed of the pixel values for the image sensor assembly 1200. In this regard, the column multiplexer 1215, column amplifiers 1210, row multiplexer 1230, and data output buffer 1245 may collectively provide an ROIC (or portion thereof) of the image sensor assembly 1200.

The column amplifiers 1225 may generally represent any column processing circuitry as appropriate for a given application (analog and/or digital), and is not limited to amplifier circuitry for analog signals. In this regard, the column amplifiers 1225 may more generally be referred to as column processors in such an aspect. Signals received by the column amplifiers 1225, such as analog signals on an analog bus and/or digital signals on a digital bus, may be processed according to the analog or digital nature of the signal. As an example, the column amplifiers 1225 may include circuitry for processing digital signals. As another example, the column amplifiers 1225 may be a path (e.g., no processing) through which digital signals from the unit cell array 1205 traverses to get to the column multiplexer 1215. As another example, the column amplifiers 1225 may include an ADC for converting analog signals to digital signals. These digital signals may be provided to the column multiplexer 1215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 1235 may generate the bias signals and provide them to the unit cells. By providing appropriate bias signals to each unit cell, the unit cell array 1205 may be effectively calibrated to provide accurate image data in response to light (e.g., IR light) incident on the detectors of the unit cells.

In an aspect, the control bias and timing circuitry 1235 may generate bias values, timing control voltages, and switch control voltages. In some cases, the DAC 1240 may convert the bias values received as, or as part of, data input signal on a data input signal line 1255 into bias signals (e.g., analog signals on analog signal line(s) 1260) that may be provided to individual unit cells through the operation of the column multiplexer 1210, column amplifiers 1220, and row multiplexer 1230. In another aspect, the control bias and timing circuitry 1235 may generate the bias signals (e.g., analog signals) and provide the bias signals to the unit cells without utilizing the DAC 1240. In this regard, some implementations do not include the DAC 1240, data input signal line 1255, and/or analog signal line(s) 1260. In an embodiment, the control bias and timing circuitry 1235 may be, may include, may be a part of, or may otherwise be coupled to the processing component 1105 and/or image capture component 1115 of FIG. 11.

In an embodiment, the image sensor assembly 1200 may be implemented as part of an imaging system (e.g., 1100). In addition to the various components of the image sensor assembly 1200, the imaging system may also include one or more processors, memories, logic, displays, interfaces, optics (e.g., lenses, mirrors, beamsplitters), and/or other components as may be appropriate in various implementations. In an aspect, the data output signal on the data output line 1250 may be provided to the processors (not shown) for further processing. For example, the data output signal may be an image formed of the pixel values from the unit cells of the image sensor assembly 1200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 1205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 1205 may represent a pixel.

Figure 13:
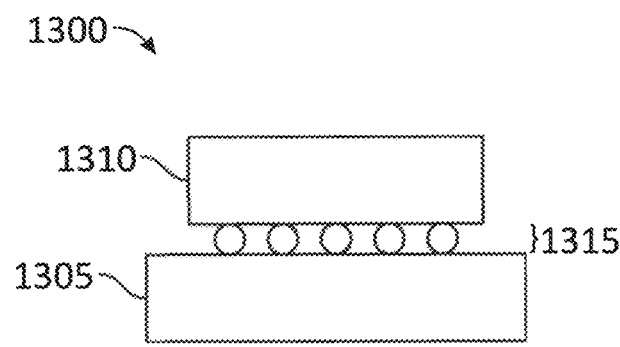
FIG. 13 illustrates an example of an image sensor assembly in accordance with one or more embodiments of the present disclosure.

In one example embodiment, components of the image sensor assembly 1200 may be implemented such that a detector array is hybridized to (e.g., bonded to) a readout circuit. For example, FIG. 13 illustrates an example of an image sensor assembly 1300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 1300 may be, may include, or may be a part of, the image sensor assembly 1200.

The image sensor assembly 1300 includes a device wafer 1305, a readout circuit 1310, and contacts 1315 to bond (e.g., mechanically and electrically bond) the device wafer 1305 to the readout circuit 1310. The device wafer 1305 may include detectors (e.g., the unit cell array 1205). The contacts 1315 may bond the detectors of the device wafer 1305 and the readout circuit 1310. The contacts 1315 may include conductive contacts of the detectors of the device wafer 1305, conductive contacts of the readout circuit 1310, and/or metallic bonds between the conductive contacts of the detectors and the conductive contacts of the readout circuit 1310. For example, the contacts 1315 may include contact layers formed on the detectors to facilitate coupling to the readout circuit 1310. In one embodiment, the device wafer 1305 may be bump-bonded to the readout circuit 1310 using bonding bumps. The bonding bumps may be formed on the device wafer 1305 and/or the readout circuit 1310 to allow connection between the device wafer 1305 and the readout circuit 1310. In an aspect, hybridizing the device wafer 1305 to the readout circuit 1310 may refer to bonding the device wafer 1305 (e.g., the detectors of the device wafer 1305) to the readout circuit 1310 to mechanically and electrically bond the device wafer 1305 and the readout circuit 1310.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
   a light pulse detection device configured to:
      detect a first mid-wave infrared (MWIR) light pulse;
      detect a second MWIR light pulse;
      determine that the first MWIR light pulse is associated with a first pulse sequence based at least on a time difference between detection of the first MWIR light pulse and detection of the second MWIR light pulse;
      determine first timing information associated with a third MWIR light pulse of the first pulse sequence, wherein the third MWIR light pulse is subsequent to the first MWIR light pulse; and
      generate first data associated with the first timing information;
   an imaging device configured to:
      determine a first integration period based on the first data; and
      capture, using the first integration period, a first image that includes the third MWIR light pulse of the first pulse sequence; and
   a display device configured to:
      receive data associated with the first pulse sequence, wherein the data comprises a location of the third MWIR light pulse; and
      display the first image and a first overlay on the first image, wherein the first overlay is indicative of the location of the third MWIR light pulse.

2. The system of claim 1, wherein the data further comprises a pulse repetition frequency associated with the first pulse sequence, wherein the display device is configured to display the first image, the first overlay on the first image, and a second overlay on the first image, wherein the second overlay is indicative of the pulse repetition frequency, and wherein the light pulse detection device comprises MWIR optics and a multi-element detector.

3. The system of claim 1, wherein the first overlay comprises a crosshair symbol, the data further comprises laser spot position information, pulse rate information, and predictive timing pulses, and wherein:
the imaging device is further configured to capture a non-light-pulse image; and
the display device is further configured to display the non-light-pulse image and the first overlay on the non-light-pulse image.

4. The system of claim 1, wherein:
the imaging device is further configured to capture a second image that includes a fourth MWIR light pulse associated with a second pulse sequence different from the first pulse sequence; and
the display device is further configured to display the second image, the first overlay on the second image, and a second overlay on the second image, wherein the second overlay is indicative of a location of the fourth MWIR light pulse.

5. The system of claim 1, wherein the light pulse detection device is further configured to:
determine the location of the third MWIR light pulse; and
provide information indicative of the location to one or more devices,
wherein the one or more devices comprise the imaging device, the display device, and/or a gimbal.

6. The system of claim 1, wherein the light pulse detection device comprises:
a detector comprising a multi-element detector;
an optical element configured to direct the third MWIR light pulse to the detector; and
a processor circuit configured to determine the location of the third MWIR light pulse based on one or more signals generated by the detector in response to the third MWIR light pulse,
wherein the location of the third MWIR light pulse comprises an azimuth angle associated with the third MWIR light pulse and an elevation angle associated with the third MWIR light pulse, and
wherein the multi-element detector comprises:
a first detector configured to generate a first photocurrent $I_1$ in response to the third MWIR light pulse;
a second detector configured to generate a second photocurrent $I_2$ in response to the third MWIR light pulse;
a third detector configured to generate a third photocurrent $I_3$ in response to the third MWIR light pulse; and
a fourth detector configured to generate a fourth photocurrent $I_4$ in response to the third MWIR light pulse,
wherein the processor circuit is configured to determine the location of the third MWIR light pulse based on the first, second, third, and fourth photocurrents.

7. The system of claim 6, wherein the processor circuit is configured to:

determine the azimuth angle based on $\frac{(I_1 + I_3) - (I_2 + I_4)}{I_1 + I_2 + I_3 + I_4}$; and determine the elevation angle based on $\frac{(I_3 + I_4) - (I_1 + I_2)}{I_1 + I_2 + I_3 + I_4}$.

8. The system of claim 1, wherein:
the light pulse detection device is further configured to determine second timing information associated with the second MWIR light pulse of the first pulse sequence; and
the imaging device is further configured to:
determine a second integration period based on the second timing information; and
capture, using the second integration period, a second image that includes the seconder MWIR light pulse; and
the display device configured to:
display, during a first time duration, the first image and the first overlay on the first image; and
display, during a second time duration subsequent to the first time duration, one or more non-light-pulse images
display, during a third time duration subsequent to the second time duration, the second image and the first overlay on the second image, wherein the location of the second MWIR light pulse is the same as a location of the third MWIR light pulse.

9. The system of claim 8, wherein the display device is configured to display, during the second time duration, the one or more non-light-pulse images and the first overlay on each of the one or more non-light-pulse images.

10. A system comprising:
an imaging device configured to capture, using a first integration period, a first image that includes a first mid-wave infrared (MWIR) light pulse of a first pulse sequence; and
a display device configured to:
receive data associated with the first pulse sequence, wherein the data comprises a location of the first MWIR light pulse; and
display the first image and a first overlay on the first image, wherein the first overlay is indicative of the location of the first MWIR light pulse; and
a light pulse detection device configured to:
detect a second MWIR light pulse;
determine that the second MWIR light pulse is associated with the first pulse sequence;
determine first timing information associated with the first MWIR light pulse of the first pulse sequence, wherein the first MWIR light pulse is subsequent to the second MWIR light pulse;
generate first data associated with the first timing information; and
determine second timing information associated with a third MWIR light pulse of the first pulse sequence; and
wherein the imaging device is further configured to:
determine the first integration period based on the first data; and
based on the second timing information, not capture any image that includes the third MWIR light pulse.

11. A method comprising:
detecting a first mid-wave infrared (MWIR) light pulse;
determining that the first MWIR light pulse is associated with a first pulse sequence;
determining first timing information associated with a second MWIR light pulse of the first pulse sequence, wherein the second MWIR light pulse is subsequent to the first MWIR light pulse;
determining a first integration period based on the first timing information;

capturing, using the first integration period, a first image that includes the second MWIR light pulse of the first pulse sequence;
receiving data associated with the first pulse sequence, wherein the data comprises a location of the second first MWIR light pulse;
displaying the first image and a first overlay on the first image, wherein the first overlay is indicative of the location of the second MWIR light pulse;
determining second timing information associated with a third MWIR light pulse of the first pulse sequence;
determining a second integration period based on the second timing information;
capturing, using the second integration period, a second image that includes the third MWIR light pulse;
displaying the second image and the first overlay on the second image, wherein the location of the second MWIR light pulse is the same as a location of the third MWIR light pulse, wherein the first image and the first overlay are displayed during a first time duration, wherein the second image and the first overlay are displayed during a third time duration subsequent to a second time duration; and
displaying one or more non-light-pulse images during the second time duration subsequent to the first time duration.

12. The method of claim 11, wherein the data further comprises:
a pulse repetition frequency associated with the first pulse sequence, wherein the displaying comprises displaying the first image, the first overlay on the first image, and a second overlay on the first image, and wherein the second overlay is indicative of the pulse repetition frequency;
capturing a non-light-pulse image; and
displaying the non-light-pulse image and the first overlay on the non-light-pulse image.

13. A system comprising:
a light pulse detection device comprises:
a detector comprises a multi-element detector comprising:
a first detector configured to generate a first photocurrent $I_1$ in response to a mid-wave infrared (MWIR) light pulse;
a second detector configured to generate a second photocurrent $I_2$ in response to the MWIR light pulse; and
a third detector configured to generate a third photocurrent $I_3$ in response to the MWIR light pulse;
an optical element configured to direct the MWIR light pulse to the detector; and
a processor circuit configured to:
determine a location of the MWIR light pulse based on the first, second, and third photocurrents, wherein the location of the MWIR light pulse comprises an azimuth angle associated with the MWIR light pulse and an elevation angle associated with the MWIR light pulse; and
provide information indicative of at least the location to one or more devices.

14. The system of claim 13, wherein the one or more devices comprise an imaging device, a display device, and/or a gimbal.

15. The system of claim 13, further comprising:
an imaging device configured to capture an image that includes the MWIR light pulse; and
a display device configured to display the image and an overlay on the image, wherein the overlay is indicative of the location of the MWIR light pulse.

16. The system of claim 15, wherein:
the imaging device is further configured to:
capture a second image that includes a second MWIR light pulse; and
capture, between capturing of the image and capturing of the second image, one or more images that do not include any light pulse; and
the display device is configured to:
display the image and the overlay on the image during a first duration;
display the one or more images during a second duration subsequent to the first duration; and
display the second image during a third duration subsequent to the second duration.

17. The system of claim 16, wherein the display device is configured to display the one or more images and the overlay on each of the one or more images.

18. The system of claim 13, wherein the multi-element detector further comprises a fourth detector configured to generate a fourth photocurrent $I_4$ in response to the MWIR light pulse.

19. The system of claim 18,
wherein the processor circuit is configured to determine the location of the MWIR light pulse based on the first, second, third, and fourth photocurrents, and wherein the processor circuit is configured to:

determine the azimuth angle based on $\frac{(I_1 + I_3) - (I_2 + I_4)}{I_1 + I_2 + I_3 + I_4}$; and determine the elevation angle based on $\frac{(I_3 + I_4) - (I_1 + I_2)}{I_1 + I_2 + I_3 + I_4}$.

20. The system of claim 13, wherein the MWIR light pulse is associated with a pulse sequence, and wherein the processor circuit is configured to determine whether to display a light pulse of the pulse sequence based on a time at which a previous light pulse of the pulse sequence was displayed.

* * * * *

UNITED STATES PATENT AND TRADEMARK OFFICE
CERTIFICATE OF CORRECTION

PATENT NO. : 11,082,641 B2
APPLICATION NO. : 16/802025
DATED : August 3, 2021
INVENTOR(S) : Strand et al.

It is certified that error appears in the above-identified patent and that said Letters Patent is hereby corrected as shown below:

In the Specification

In Column 7, Line 47, change "pule" to --pulse--.

In the Claims

In Claim 8, Column 30, Line 10, change "seconder" to --second--.

In Claim 11, Column 31, Line 6, change "first MWIR light pulse;" to --MWIR light pulse;--.

Signed and Sealed this
Twenty-first Day of June, 2022

Katherine Kelly Vidal
*Director of the United States Patent and Trademark Office*